(12) United States Patent
Smart

(10) Patent No.: US 9,302,538 B2
(45) Date of Patent: Apr. 5, 2016

(54) MULTI-SURFACE RIM FOR ENHANCED EFFICIENCY

(71) Applicant: Smart Aero Technology Limited, Brackley (GB)

(72) Inventor: Simon Smart, Brackley (GB)

(73) Assignee: ENVE Composites, LLC, Ogden, UT (US)

(*) Notice: Subject to any disclaimer, the term of this patent is extended or adjusted under 35 U.S.C. 154(b) by 521 days.

(21) Appl. No.: 13/655,028

(22) Filed: Oct. 18, 2012

(65) Prior Publication Data

US 2013/0049441 A1   Feb. 28, 2013

Related U.S. Application Data

(63) Continuation of application No. PCT/US2011/033061, filed on Apr. 19, 2011.

(60) Provisional application No. 61/325,720, filed on Apr. 19, 2010.

(51) Int. Cl.
*B60B 3/00*   (2006.01)
*B60B 21/00*  (2006.01)
(Continued)

(52) U.S. Cl.
CPC ............. *B60B 21/00* (2013.01); *B60B 1/003* (2013.01); *B60B 25/00* (2013.01); *B60B 1/06* (2013.01)

(58) Field of Classification Search
CPC .......... B60B 5/00; B60B 21/06; B60B 21/00; B60B 1/06
USPC ................. 301/55, 58, 95, 96, 97, 98, 110.5
See application file for complete search history.

(56) References Cited

U.S. PATENT DOCUMENTS 3,158,404 A    11/1964  Noakes
3,656,531 A *   4/1972  Ross et al. .................. 152/10
(Continued)

FOREIGN PATENT DOCUMENTS

EP    0 820 880 A1   1/1998
EP    1 795 370 A1   6/2007
(Continued)

OTHER PUBLICATIONS

European Patent Application EP 11 77 2557 Supplementary Search Report mailed Apr. 7, 2014.
(Continued)

*Primary Examiner* — S. Joseph Morano
*Assistant Examiner* — Jean Charleston
(74) *Attorney, Agent, or Firm* — Woodard, Emhardt, Moriarty, McNett & Henry LLP

(57) ABSTRACT

Embodiments described herein provide for one or more of: (1) airflow enhancement around a rim using cusps that create virtual surfaces of air with the bike in motion, which also encourage favorable air attachment around the rim; (2) wake reduction by streamlining the airfoil around the rim using trip edges at various points of rim surface transition, which cause a laminar flow to go turbulent for enhancing the streamline effect; (3) a double rim surface, which provides an air slot between the two rim surfaces at a distance that enhances flow attachment and adds energy of air flow around the rim by moving air between areas of high and low pressure; and (4) a tubeless tire rim kit capable of converting conventional rims into tubeless ones and also promoting the sealing of the tire to the rim with minimal air pressure necessary to create the seal.

19 Claims, 19 Drawing Sheets

(51) Int. Cl.
  *B60B 1/00*    (2006.01)
  *B60B 25/00*   (2006.01)
  *B60B 1/06*    (2006.01)

(56) References Cited

U.S. PATENT DOCUMENTS

| | | | | |
|---|---|---|---|---|
| 3,732,951 | A * | 5/1973 | Hata et al. | 188/24.13 |
| 3,862,779 | A * | 1/1975 | Jayne | 301/64.705 |
| 4,280,736 | A * | 7/1981 | Raudman | 301/6.3 |
| 4,919,490 | A | 4/1990 | Hopkins et al. | |
| 4,995,675 | A * | 2/1991 | Tsai | 301/64.705 |
| 5,061,013 | A * | 10/1991 | Hed et al. | 301/64.704 |
| 5,080,444 | A * | 1/1992 | Hopkins et al. | 301/95.107 |
| 5,104,199 | A * | 4/1992 | Schlanger | 301/64.704 |
| 5,246,275 | A * | 9/1993 | Arredondo, Jr. | 301/64.705 |
| 5,249,846 | A * | 10/1993 | Martin et al. | 301/95.102 |
| 5,415,463 | A * | 5/1995 | Olson et al. | 301/64.702 |
| 5,490,719 | A * | 2/1996 | Lew | 301/5.1 |
| 5,540,485 | A * | 7/1996 | Enders | 301/104 |
| 5,893,614 | A | 4/1999 | Dennis | |
| 5,975,645 | A | 11/1999 | Sargent | |
| 7,114,785 | B2 | 10/2006 | Ording et al. | |
| 2007/0200422 | A1 | 8/2007 | Davis et al. | |

FOREIGN PATENT DOCUMENTS

| | | |
|---|---|---|
| FR | 2 701 899 A1 | 9/1994 |
| WO | WO 97/46072 A2 | 12/1997 |

OTHER PUBLICATIONS

International Patent Application PCT/US2011/033061 International Search Report and Written Opinion mailed Jul. 14, 2011.
International Patent Application PCT/US2011/033065 International Search Report and Written Opinion mailed Jul. 14, 2011.

* cited by examiner

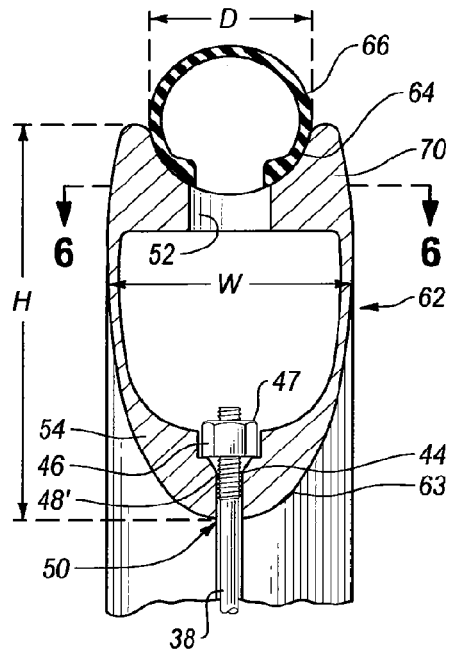
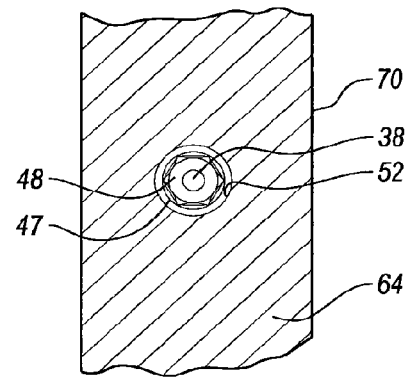
FIG. 5  FIG. 6
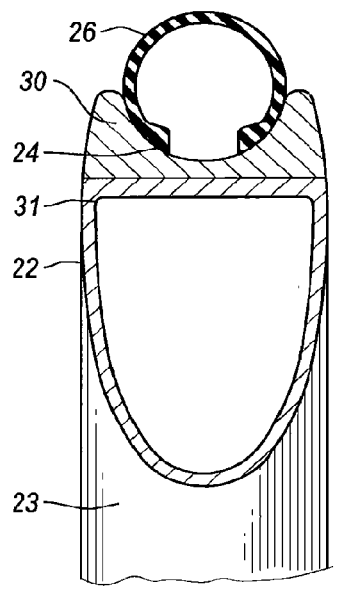
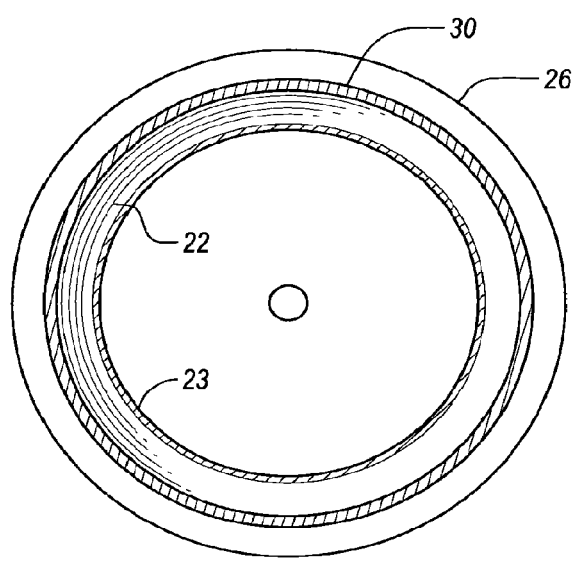
FIG. 7  FIG. 8

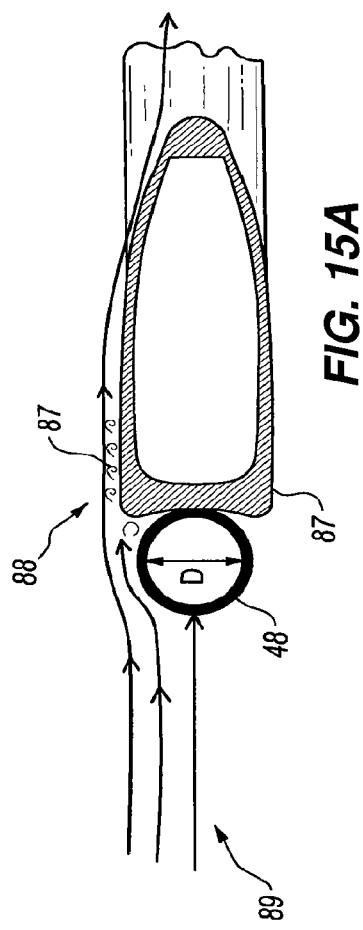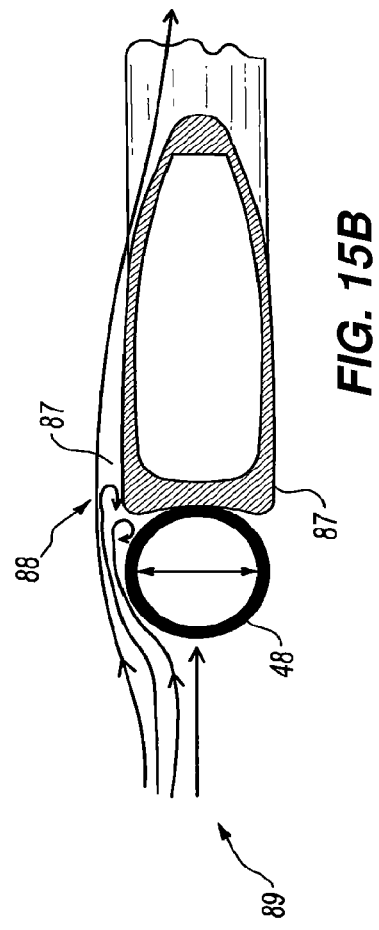

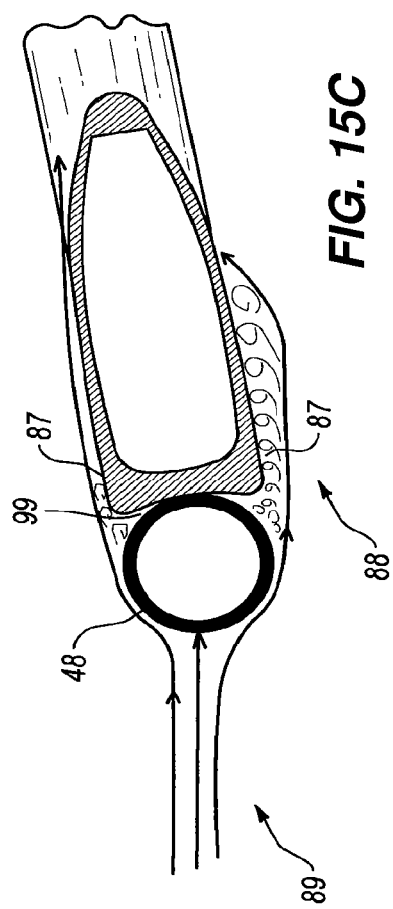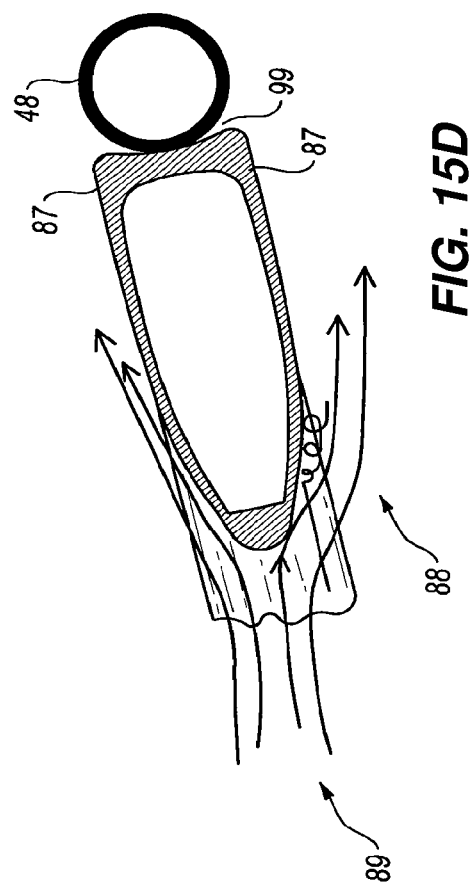

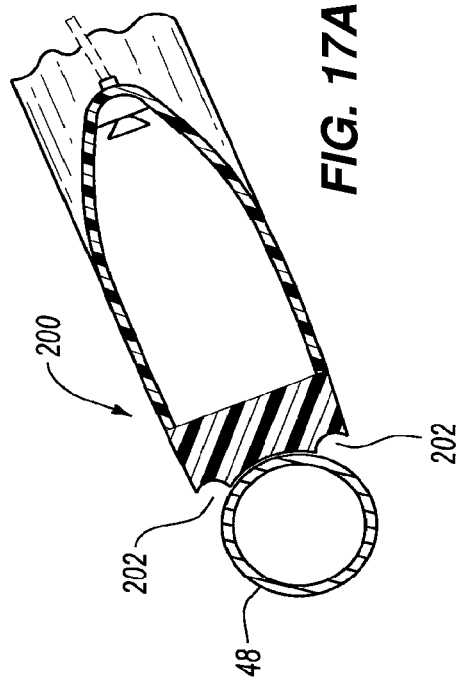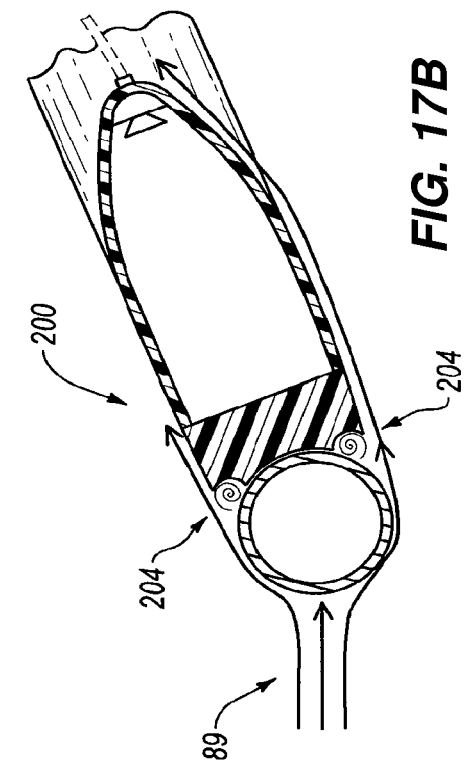

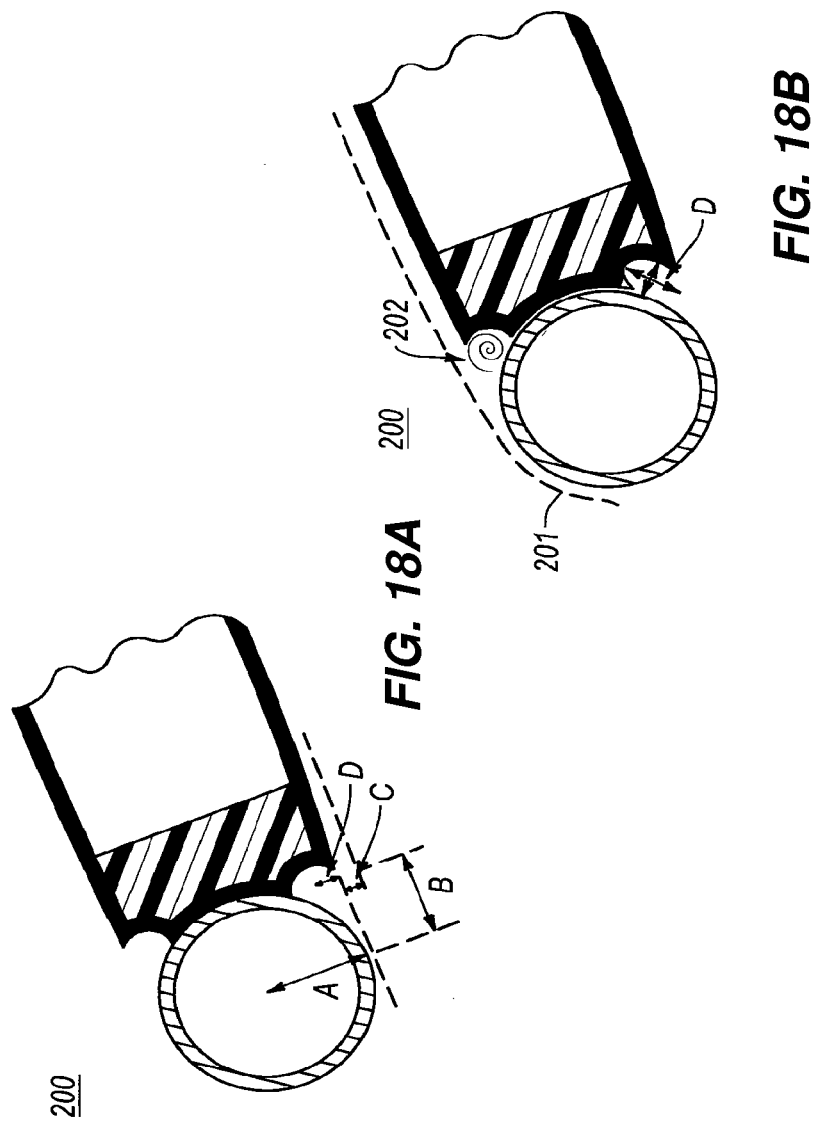

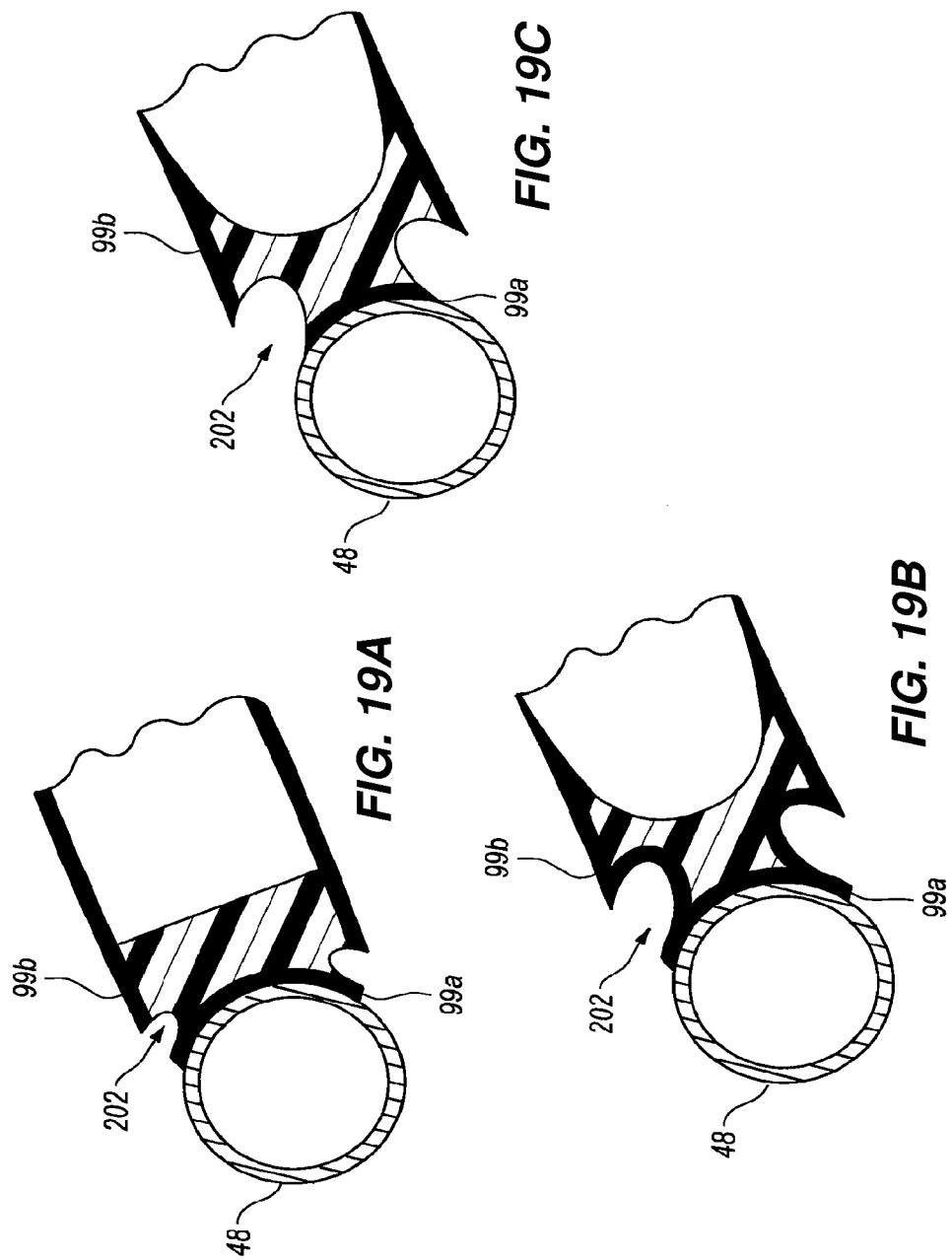

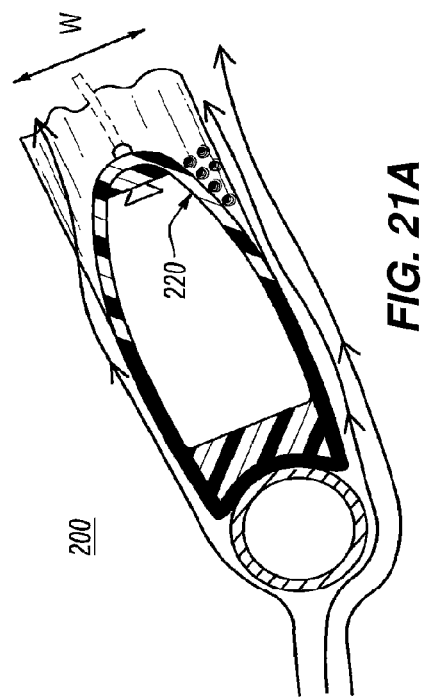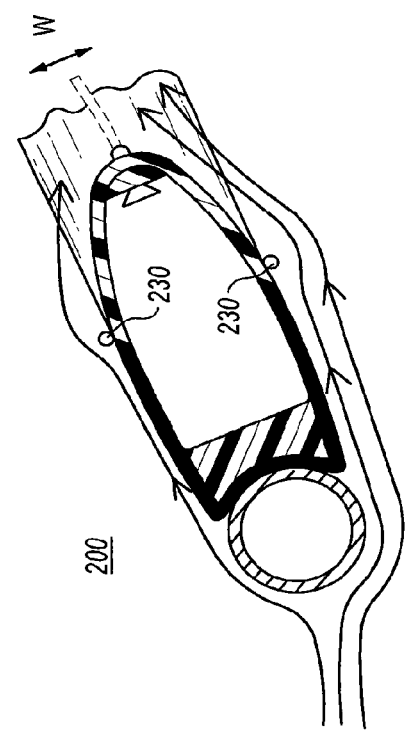

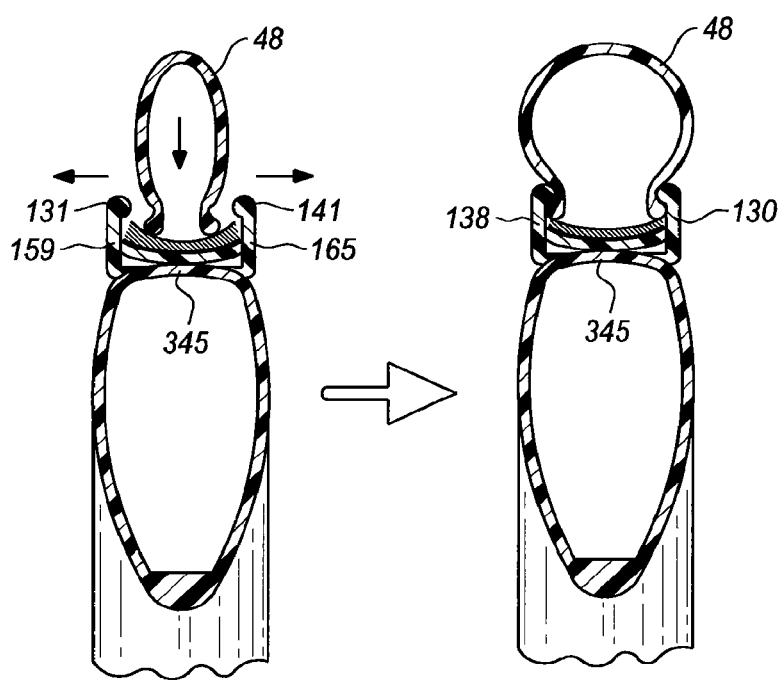
FIG. 27A   FIG. 27B

MULTI-SURFACE RIM FOR ENHANCED EFFICIENCY

CROSS-REFERENCE TO RELATED APPLICATIONS

This application is a continuation of International Application No. PCT/US2011/033061 filed Apr. 19, 2011, which claims the benefit of and priority to the U.S. Provisional Application No. 61/325,720 filed Apr. 19, 2010 entitled "BICYCLE RIM EFFICIENCY", the contents of which are incorporated herein by reference in their entirety.

BACKGROUND

Most everyone experiences the joy of riding a bike at one point in their lifetime and many learn to ride at a very young age. Because a young child can master its basic principles, the act of riding a bike itself appears very simple. The physics behind the exhilarating act itself, however, are anything but. The cyclist needs to overcome numerous types of forces acting on the properties of balancing, steering, braking, accelerating, suspension activation, vibration and many other bicycling characteristics. Moreover, many of the forces in each physical realm are open to change and depend on their surrounding environment and/or forces from other properties, which adds several orders of complexity.

To consider the complexities of a bike as a whole becomes somewhat overwhelming. Nevertheless, each force that acts on the physical aspects or properties associated with a bike and its rider can be broken down into smaller, more manageable pieces. For example, if we consider a cyclist or rider and her bike as a single system, the forces that act on that system and its components can be roughly divided into two groups: internal and external forces. Internal forces are mostly caused by the rider and the rider's interaction with the bike (e.g., by bicycle component friction). External forces, on the other hand, are due to gravity, inertia, contact with the ground, and contact with the atmosphere.

While the internal forces can have a significant impact on bicycle performance, most any bicycle racer will agree that the largest resistance comes from the induced external force of the bicycle's movement through the air. As a rider attempts to move faster, the atmospheric drag and crosswind forces become greater, which in turn requires the rider to expend greater energy to overcome them. Thus, these forces become an important consideration in bike designs, especially in the areas of bicycle racing and triathlons.

One of the major sources of these dynamic atmospheric forces results from the flow of air over and around the bicycle wheels. Over the years, many have attempted to reduce the drag in wheels through the use of a "solid" or "disc" wheel, which are wheels without spokes. Such disc shape alleviates the drag caused by the movement of air over the spokes and over and around the wheel rim; however, such rims suffer from stability control caused from the other aerodynamic force of crosswind. More specifically, as wind forces perpendicular to the disc surface increase, an increased wind-loading force is transmitted from the disc surface to the bicycle handlebars. This requires the rider to apply a control force to the handlebars that varies as the wind-loading changes. Additionally, the force exerted by a sudden crosswind can destabilize the bicycle and rider; resulting in a need for forward speed reduction to regain stability.

Until recently, cyclists have been forced to choose either traditional spoked wheels with their inherent drag component or solid wheels with their inherent crosswind disadvantages. Recent attempts to reconcile these two types of wheels have led to a compromise wheel design. This design employs a limited number of solid spokes in conjunction with the bicycle rim. These wheels resemble a solid wheel with large "cutouts" in the disc to minimize the crosswind effects. Despite these efforts, the compromise designs can still suffer from objectionable crosswind, wind-loading, drag and otherwise do not include optimum aerodynamic or structural characteristics.

BRIEF SUMMARY

The above-identified deficiencies and drawback of bicycle systems is overcome through example embodiments of the present invention. For example, embodiments described herein provide for a multi-surface (e.g., dual, triple, quadruple, etc.) rim surface, which provides an air slot between the rim surfaces at a distance that enhances flow attachment and adds energy of air flow around the rim by moving air between areas of high and low pressure. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one example embodiment, a dual rim surface is provided that enhances flow from a true or windward side to enter on a leeward side. In other words, the air gap between the double rim surfaces adds energy of air flow to the system and retrains the otherwise separated flow on the leeward side, which encourages an overall air flow attachment similar to a solid disc rim, but reduces the inherent crosswind disadvantage. Note that this embodiment works well with either a spoked, disc, or hybrid (e.g., tri or quad spoke) wheels and aids the air flow around the rim, similar to a solid rim, with improved crosswind stability.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a cross section of the wheel depicted in FIG. 4 in the plane defined by lines 5-5;

FIG. 6 is a fragmentary plan view of the tire mounting surface perpendicular to the plane formed by lines 6-6 in FIG. 5;

FIG. 7 is a cross section of the wheel of FIG. 1 in the plane formed by lines 7-7 shown without filling material;

FIG. 8 is a cross section of the wheel rim of FIG. 1 taken at the plane formed by lines 8-8;

FIGS. 15A, 15B, 15C, and 15D illustrate airflow considerations for yew angles of zero and 10 degrees respectively for implementing various aspects of the present invention;

FIGS. 16A and 16B illustrate an ideal solution and practical considerations for enhancing airflow by reducing drag around the wheel at the junction of the tire and FIGS. 17A and 17B illustrates cusps used at a leading edge of a rim for inducing a favorable pressure gradient in accordance with example embodiments of the present invention;

FIGS. 18A and 18B illustrates design considerations for the cusp at the leading edge of the rim in accordance with exemplary embodiments of the present invention;

FIGS. 19A, 19B, and 19C illustrate various designs of leading edge cusps based on the design considerations of FIGS. 18A and 18B and other factors in accordance with exemplary embodiments of the present invention;

FIGS. 21A and 21B illustrates the use of trip edges for reducing a natural occurring wake in accordance with example embodiments of the present invention;

FIGS. 27A and 27B illustrates the use of the tubeless tire kits shown in FIGS. 26A and 26B for mounting a tire in accordance with exemplary embodiments of the present invention.

DETAILED DESCRIPTION

Figure 1:
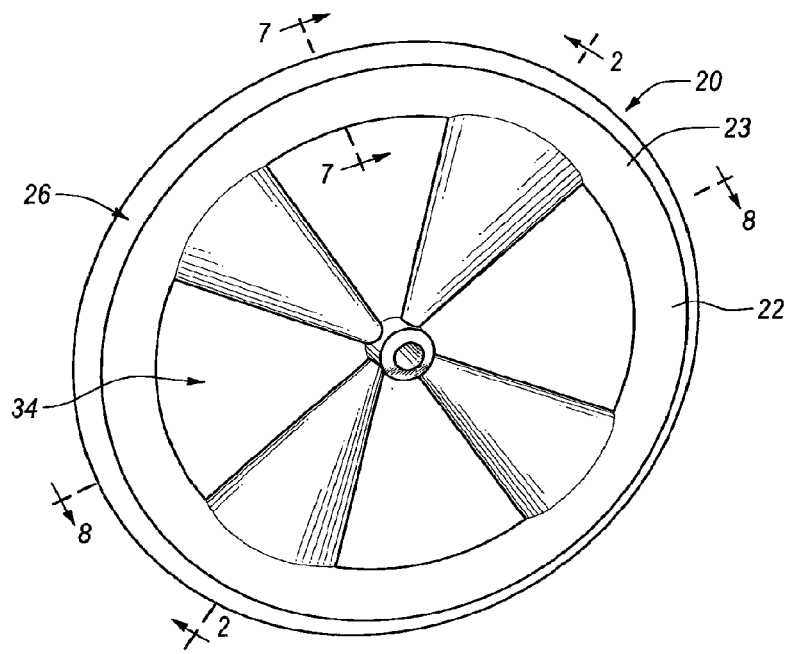
FIG. 1 is a perspective view of a bicycle wheel having a tire mounted thereon.
Figure 3:
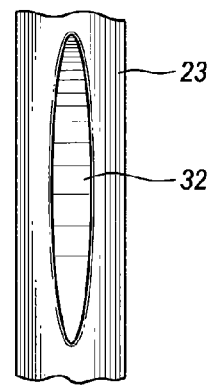
FIG. 3 is a fragmentary plan view of a streamlined inner rim surface taken along lines 3-3 of FIG. 2.

The present invention extends to methods, systems, and devises for maximizing air flow or reducing drag coefficients caused by turbulence associated with areas of discontinuity between the various components of a rim. Similarly, other embodiments reduce the inherent drag of typical spoke wheels by increasing the surface area of rim (thus enhancing airfoil similar to solid or larger surface area rim designs), while simultaneously providing better cross wind handling through a double rim design. A separate embodiment described herein also provides for a tubeless sealing kit that advantageously assists in sealing a tubeless bike tire with minimal air pressure by providing a stability and/or edge guidance system within the rim.

Prior to discussing each of the above embodiments in greater detail, it is useful to understand some of the basic principles in aerodynamics used in describing various exemplary embodiments and advantageous features thereof. As previously mentioned, a large consideration in the development of bicycle rims is dynamic property known as drag (sometimes called air resistance or fluid resistance), which refers to forces that oppose the relative motion of an object through a fluid (a liquid or gas). Drag forces act in a direction opposite to the oncoming flow velocity. Unlike other resistive forces such as dry friction, which is nearly independent of velocity, drag forces depend on velocity.

For a solid object moving through a fluid, the drag is the component of the net aerodynamic or hydrodynamic force acting opposite to the direction of the movement. The component perpendicular to this direction is considered lift. Therefore drag opposes the motion of the object, and in a powered vehicle it is overcome by thrust Lift-induced drag (also called induced drag) is drag which occurs as the result of the creation of lift on a three-dimensional lifting body, such as the wing or fuselage of an airplane. Induced drag consists of two primary components, including drag due to the creation of vortices (vortex drag) and the presence of additional viscous drag (lift-induced viscous drag). The vortices in the flow-field, present in the wake of a lifting body, derive from the turbulent mixing of air of varying pressure on the upper and lower surfaces of the body, which is a necessary condition for the creation of lift.

With other parameters remaining the same, as the lift generated by a body increases, so does the lift-induced drag. For an aircraft in flight, this means that as the angle of attack, and therefore the lift coefficient, increases to the point of stall, so does the lift-induced drag. At the onset of stall, lift is abruptly decreased, as is lift-induced drag, but viscous pressure drag (a component of parasite drag) increases due to the formation of turbulent unattached flow on the surface of the body.

Parasitic drag (also called Skin Friction Drag) is drag caused by moving a solid object through a fluid medium (in the case of aerodynamics, more specifically, a gaseous medium). Parasitic drag is made up of many components, the most prominent being form drag. Skin friction and interference drag are also major components of parasitic drag.

Skin friction arises from the friction of the fluid against the "skin" of the object that is moving through it. Skin friction arises from the interaction between the fluid and the skin of the body, and is directly related to the wetted surface, the area of the surface of the body that is in contact with the fluid. As with other components of parasitic drag, skin friction follows the drag equation and rises with the square of the velocity.

Skin friction occurs at a boundary layer, which is that layer of fluid in the immediate vicinity of a bounding surface. The boundary layer effect occurs at the field region in which all changes occur in the flow pattern. The boundary layer distorts surrounding nonviscous flow and is a phenomenon of viscous forces.

When fluid or air flows in parallel layers across the boundary, with no disruption between the layers, laminar flow occurs, sometimes known as streamline flow. It is the opposite of turbulent flow, which from a nonscientific standpoint laminar flow is "smooth," while turbulent flow is "rough." For example, consider the flow of air over an airplane wing. The boundary layer is a very thin sheet of air lying over the surface of the wing (and all other surfaces of the airplane). Because air has viscosity, this layer of air tends to adhere to the wing. As the wing moves forward through the air, the boundary layer at first flows smoothly over the streamlined shape of the airfoil. Here the flow is called laminar and the boundary layer is a laminar layer.

Turbulence or turbulent flow, on the other hand, is characterized by chaotic, stochastic property changes. This includes low momentum diffusion, high momentum convection, and rapid variation of pressure and velocity in space and time. Turbulence causes the formation of eddies of many different length scales, with a majority of the kinetic energy of the turbulent motion contained in large scale structures. The energy "cascades" from these large scale structures to smaller scale structures by an inertial and essentially inviscid mechanism, which continues, creating smaller and smaller structures; thus producing a hierarchy of eddies. Eventually this process creates structures that are small enough that molecular diffusion becomes important and viscous dissipation of energy finally takes place.

Turbulent diffusion is usually described by a turbulent diffusion coefficient. The turbulent diffusivity is the simplest approach for quantitative analysis of turbulent flows, and many models have been postulated to calculate it. Still, the complete description of turbulence remains one of the unsolved problems in physics. According to an apocryphal story Werner Heisenberg was asked what he would ask God, given the opportunity. His reply was: "When I meet God, I am going to ask him two questions: Why relativity? And why turbulence? I really believe he will have an answer for the first."

As mentioned above, skin friction is caused by viscous drag in the boundary layer around the object. The boundary layer at the front of the object is usually laminar and relatively thin, but becomes turbulent and thicker towards the rear. The position of the transition point depends on the shape of the object. Generally, there are two ways to decrease friction drag: the first is to shape the moving body so that laminar flow is possible, like an airfoil. The second method is to decrease the length and cross-section of the moving object as much as is practicable.

Profile Drag (Pxp): depends on the longitudinal section of the body. A diligent choice of body profile is more than essential for low drag coefficient. Streamlines should be continuous and separation of the boundary layer with its attendant vortices should be avoided.

An airfoil-shaped body moved through a fluid produces a force perpendicular to the motion, again called lift. Subsonic flight airfoils have a characteristic shape with a rounded leading edge, followed by a sharp trailing edge, often with asymmetric camber. Foils of similar function designed with water as the working fluid are called hydrofoils.

The lift on an airfoil is primarily the result of its shape (in particular its camber) and its angle of attack. When either is positive, the resulting flowfield about the airfoil has a higher average velocity on the upper surface than on the lower surface. This velocity difference is necessarily accompanied by a pressure difference, via Bernoulli's principle for incompressible inviscid flow, which in turn produces the lift force. The lift force can also be related directly to the average top/bottom velocity difference, without invoking the pressure, by using the concept of circulation and the Kutta-Joukowski theorem.

In considering the above aerodynamic concepts, take flow of air around a bicycle tire and rim. FIGS. 15A, 15B, 15C, and 15D illustrate airflow of cross sectional views of various size tires and rims with considerations for yew angles of zero and 10 degrees, respectively. The following explanation of the above turbulence noted at the boundary layer of the surface of a rim generally refers to these figures and can be best understood by considering the wheel (i.e., tire and rim) to be stationary, with air flowing around it.

For example, FIG. 15A illustrates the flow of air around a cross section of a conventional wheel with parallel braking surface 87 and a tire 48 with diameter D of smaller dimension (e.g., 18 mm). If the tire is smooth, the boundary layer 88 air flow 89 over the front of the spherical part of the tire 48 would be laminar at typical conditions. As shown, however, the boundary layer or air flow 89 tends to separate early at the boundary layer 88 between the tire 48 and the leading edge of rim 99, as well as some separation occurring on the parallel braking surface 87. This turbulence is caused as the pressure gradient switches from favorable (pressure decreasing in the flow direction) to unfavorable (pressure increasing in the flow direction). With the smaller tire 48, however (and at a yew angle of zero degrees for a cross wind as shown), the turbulence generated has little effect on the flow attachment at the trailing edge of the rim. In other words, conventional wheels with parallel braking surfaces and smaller tires have relatively good flow attachment and perform suitably well at zero degree cross winds. This type of performance, however, is not as good with larger size tires.

For example, FIG. 15B shows the wind flow 89 around a cross section of a conventional wheel with a larger diameter (D2) tire 48 at a zero degree cross wind. Such larger tires 48 (e.g., a 23 mm diameter) have become more popular due to their better reliability in lower rolling resistance. As shown, however, the turbulence 88 created from the discontinuity between the tire and the leading edge 99 of the rim, along with the skin drag at the parallel braking surfaces 87, causes larger flow separation 88 and generally a drag increase.

As illustrated in FIG. 15C, the large separation of turbulence 88 causes even more problems in a crosswind. In other words, the geometry of conventional or standard rims is not favorable in a cross wind of even just 10 degrees as shown. In fact the region 88 (including the interface between the rim 99 and the tire 48, along with turbulence induced at the parallel braking surface 87), presents the air flow 89 with an unfavorable pressure gradient (pressure increasing in the flow direction), creating a large region of low pressure behind trailing edge of the wheel—which in turn creates a high form drag. In other words, it makes it virtually impossible to achieve a flow attachment at the trailing edge and also generates unwanted side forces. Similarly, on the back of conventional wheels at a yew crosswind angle of 10 degrees as shown in FIG. 15D, the relatively narrow (or pointy) rim shape causes leading edge separation 88, which again causes an unfavorable pressure gradient, increasing the drag and causing additional side force.

Figure 16A:
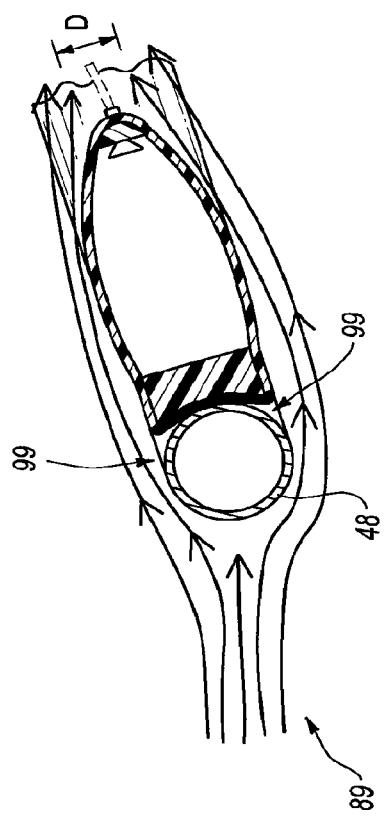
Figure 16B:
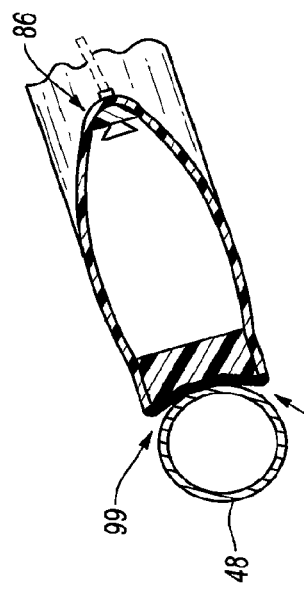

One simple solution to the turbulence at the boundary between the tire 48 and rim 99, along with the surface boundary problem at the discontinuity of the parallel braking surface 87, is illustrated in FIGS. 16A and 16B. More specifically, FIG. 16A illustrates a simple solution for enhancing airflow and reducing drag around the wheel at the junction of the tire 48 and rim 99. First, an intersection 99 at the boundary between the leading edge of the rim and tire 48 can be made that promotes continuous or solid boundary layer to reduce the eddies created by the cavity separation. Next, the simple "ideal" rim needs non parallel, shaped braking surface such as the torodial shaped rim described herein after. Further, the radius or diameter D at the trailing edge of the rim can be made larger to help attachment when flow goes in the opposite direction (as in FIG. 15D).

Making an intersection 99 like the one shown in FIG. 16A, however, is not a practical solution. More specifically, extending the leading edge 99 of the rim out around sides of the tire 48 causes stability problems and performance issues. For example, the stiffness of the rim 99 along the sides of the tire 48 changes the rolling resistance of the tire 48, creating a stiffer feel and harsher ride. Further, such design will cause variance in sensitivity across the different tire 48 sizes; creating a need for a different rim designs for each individual size tire. Similarly, the likelihood of the rim 99 contacting the ground increases even at low leaning angles, which can cause stability issues and damage to the rim itself. Nevertheless, as illustrated in FIG. 16B, the practical solution needs to reduce the cavity between the leading edge of the rim 99 and the tire 48, without the mechanical issues of poor tire performance, feel, harsh ride, and stability. Nevertheless, as noted above, flow 89 seems to separate on larger circular tires 48 and the point of separation moves a lot causing poor repeatability, stability and high dependence of tire design or rim shape.

The drawbacks of conventional wheels and the inherent disadvantages of "ideal" solutions is overcome through example embodiments that utilize "trip edges" in generating favorable pressure gradients for enhancing the airflow around a rim and increase performance across a wider range of crosswind yew angles. In accordance with exemplary embodiments, the front and other areas of a rim can be used to help control flow stability by using "trip edges" to control airfoil around the rim. For example, in a first embodiment, as shown in FIGS. 17A and 17B, cusps 202 can be used at the leading edge of a rim to generate standing vortices 204 for creating a virtual continuous surface at the junction between the tire and rim. More specifically, FIG. 17A shows cusps 202 at the leading edge 99 of the rim, at the interface between the tire 48 and the rim 200. As shown in FIG. 17B, a correctly shaped trip edge or cusp, encourages a standing vortex 204, which advantageously creates a virtual surface of continuity between the rim and the tire. In other words, the use of a cusp 202 at the leading edge promotes a favorable pressure gradient that acts as the extension of the rim similar to the "ideal" solution noted above, without the drawbacks of stiffness, stability, feel, and performance. Similarly, the leading edge cusp shape can be used like a flow trip to promote flow reattachment in a favorable pressure gradient, which will make the rim less sensitive to tire diameter and changing wind conditions with varied levels of turbulence.

In other words, by making the leading edge of the rim into a cusp shape, a trip flow causes a circulation or vortex 204 between the tire and rim, which forms a smoother virtual surface for the flow field. This generates a low pressure which will help flow attachment and reduce drag. Further, the virtual profiled rim helps control flow but does not make contact with the tire, which tends to make the feel of the wheel very different as noted above. Further, the virtual edge improves the flow stability at most yaw angles, leads to drag reduction, and reduced sensitivity of differing tire sizes. Moreover, this unique embodiment gives the same performance from a narrower rim with a "flatter" or more parallel braking surface, i.e., where less width means better straight ahead drag reduction and improved performance means that the rim shape can even be more conventionally flat braking surface; however, all types of braking surfaces are herein considered.

As one will appreciate, there are many design consideration for promoting trip edges with the use of one or more cusps. In fact, based on a myriad of factors including tire size, wheel surface area, desired performance, stability, feel, and ride, the cusp(s) can be designed and positioned in just about any area and in numerous ways for promoting a favorable pressure gradient for reducing drag and promoting flow attachment. As such, numerous types of cusps designs are contemplated herein; and therefore, the use of any particular type of cusp design or placement thereof on the surface or (leading or trailing) edge of a rim is used herein for illustrative purposes only and is not meant to limit or otherwise narrow the scope of the present invention unless otherwise explicitly claimed.

For example, FIGS. 18A and 18B illustrates just a few of the design considerations for the cusp at a leading edge of the rim in accordance with exemplary embodiments of the present invention. As shown in FIG. 18B, the shape of the cusp "D" (e.g., elliptical, rectangular, round, square, triangular, hexagonal, etc.) should be a consideration in the proper design and will depend on other factors or design preferences, e.g., the standard size of the tire, the surface area of the rim, the type of use of the wheel, etc. Further, the leading edge radius (e.g., the lip of the cusp), its angle relative to the surface area of the rim, and extension from the widest part of the rim "C" can also be some design considerations. These parameters will give, inter alia, a compromise between low and high yew angles. For example, bigger radiuses usually mean greater drag at zero degrees yew, but promote enhanced air flow and less drag at greater degrees (e.g., larger than 10).

Another cusp parameter for consideration shown in FIG. 18A is the lateral position "A" as to how far the leading edge of the cusp extends relative to the center position of the tire 48. Similarly, the position relative to the rim leading edge "B" will also affect the air flow relative to the other design considerations, and thus should also be considered. Of course, as mentioned above, there are numerous factors to consider in choosing the appropriate cusp shape and placement such as curvature, depth, and tire types, and others. For example, FIGS. 19A, 19B, and 19C illustrate various designs of leading edge cusps based on the design considerations of FIGS. 18A and 18B and other factors in accordance with exemplary embodiments of the present invention. Note again, however, that FIGS. 19A, 19B, and 19C illustrate just a few such shapes that may be used in accordance with current exemplary embodiments; however, many, many more are also contemplated herewith.

As shown in FIGS. 19A, 19B, and 19C, the leading edge closest to the tire 99a can more fully be formed much like the "ideal" design consideration adapting it very close to the tire with little or no gap between the rim surface and the tire 48. The trailing edge of the leading edge of the rim 99b can further take many forms from pointed edges (as shown in FIG. 19C), to more rounded forms (like FIG. 19B). Also, the size, shape and positioning of the cusp 202 itself will vary relative to the tire and the leading edge 99a (as also shown in FIGS. 19A, 19B, and 19C)—again based on the myriad of design preferences and considerations noted above. Because of the many varying degrees of design considerations and preferences, example embodiments are not intended to be limited to any specific form, shape, size, positioning, etc., unless otherwise specifically claimed. Instead, the use of the design parameters noted above along with the need to enhance the overall airfoil around the rim 200 (at a wide range of yaw angles) becomes an advantageous consideration for advancing wheel and rim designs. Accordingly, we now consider some other types of trip edges that may be used for enhancing the overall efficiency of airfoil around a rim 200.

Figure 20:
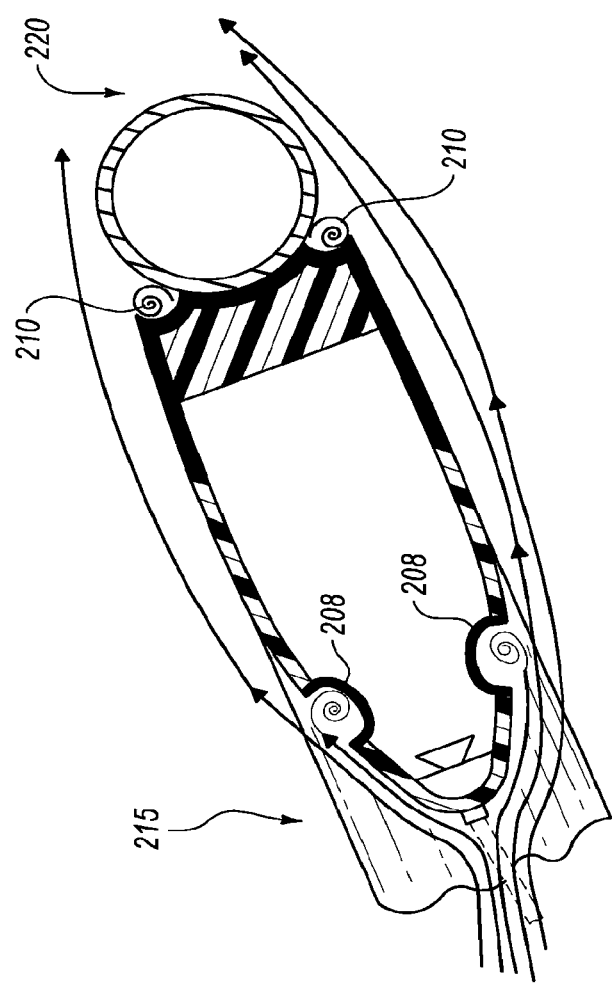
FIG. 20 illustrates the use of cusps on the surface of the rim in accordance with alternative example embodiments of the present invention.

For example, FIG. 20 illustrates the use of cusps on the surface of the rim for promoting a favorable pressure gradient on the trailing edge of the rim for reverse airflow in accordance with alternative example embodiments of the present invention. In other words, by also placing cusps 208 at the trailing edge of the rim, improved pressure distribution to form a desired virtual shape for promoting good flow characteristics not only in the attachment direction, but also in the reverse direction. In fact, cusps can be placed on just about any place on the surface of the rim desired for creating low pressure cores (e.g., at or near a boundary transition) for promoting favorable pressure gradients across the boundary layer of the rim. Similarly, note that although the low pressure vortex cores 210 at the leading edge of the rim have little if any effect as a trip since flow is no longer turbulent in a laminar boundary later, such low pressure can still help to improve attachment control around a portion of the tire, thus reducing the wake. In other words, another design consideration no of the cusp at not only the surface layer of the rim, but also at the leading edge of he rim, is the wake reduction characteristics that can be achieved in the reverse or backwards flow direction noted in FIG. 20.

FIGS. 21A and 21B illustrates the use of trip edges at or near various transitional surfaces for inducing early turbulent laminar flow of the rim. Such early turbulence enhances the streamlines to follow the curvature of airfoil, which reduces the wake naturally generated from the turbulent separation at the transitions in accordance with example embodiments of the present invention. Note that the flow at the surface of the wheel is more complicated than previously shown, due to a thin boundary set up by rotation. Accordingly, example embodiments herein contemplate the use of the cusp as a trip edge, leading edge step, and/or transition trip in different applications to tractional aerodynamics. If the airfoil in FIG. 21A represents a wheel, tractional theory deals with the large wake "W" caused by turbulent separation 220 due to geometry restraints for sever change in curvature of the rim. In other words, the laminar boundary layer is unable to stay attached to the surface, causing an early separation and high drag.

As shown in FIG. 18B, the principle of the cusp embodiment or cavity shape 202 that enhances a vortex rotation (i.e., a standing vortex with low pressure core) yields an effective camberline 201; thus, providing a flow reattachment point with a favorable pressure gradient. Similarly, as illustrated in FIG. 21B, if a transitional trip (e.g., trip wire 230) is positioned at a proper location, the laminar flow will go turbulent early. Although this gives rise to surface drag, it allows the streamlines to follow the curvature of the airfoil; thus, reducing the wake "W". Accordingly, example embodiments consider various types and combinations of using trip edges to produce an optimum pressure gradient or induce laminar turbulence as necessary to reduce other forms of drag. Note that the types of trip edges used in transitional trips can vary widely including the cusps previously described, wire trip edges that circle the surface of the rim, grit or other similar rim surfaces such as 3D pinked tape. In other words, the use of the trip edges allows for the promotional transition to turbulence; therefore resulting in higher skin friction, but moves the point of boundary layer separation further along, resulting in lower form drag and lower overall drag.

Double Rim Embodiment

Recent studies show that deep-rimmed aerodynamic wheels have a tremendous advantage over standard box-shaped rims. This is due in large part to their ability to keep airflow attached to the rim longer, thus reducing turbulent drag significantly. In fact, some studies suggest that a conventional 100 mm rim may offer one to one and three quarter minutes advantage over conventional box-shaped rims. When seconds count talking 'minutes' should get the competitive-minded rider to sit up and take notice. This advantage equates to saving the rider 15-30 watts, or 50-100 calories per hour of effort for the same speed, which is a very useful way to save energy in road races of three to six hours.

Such rims, however, are illegal for (UCI) Union Cyclist International volume/area guidelines beyond 100 mm, which limits the side area of wheels for road runs. In addition, for similar reasons as those previously described, separation can occur on leeward or low pressure side of the rim. Such early separation causes a wider wake, thus increasing the drag.

Figure 22:
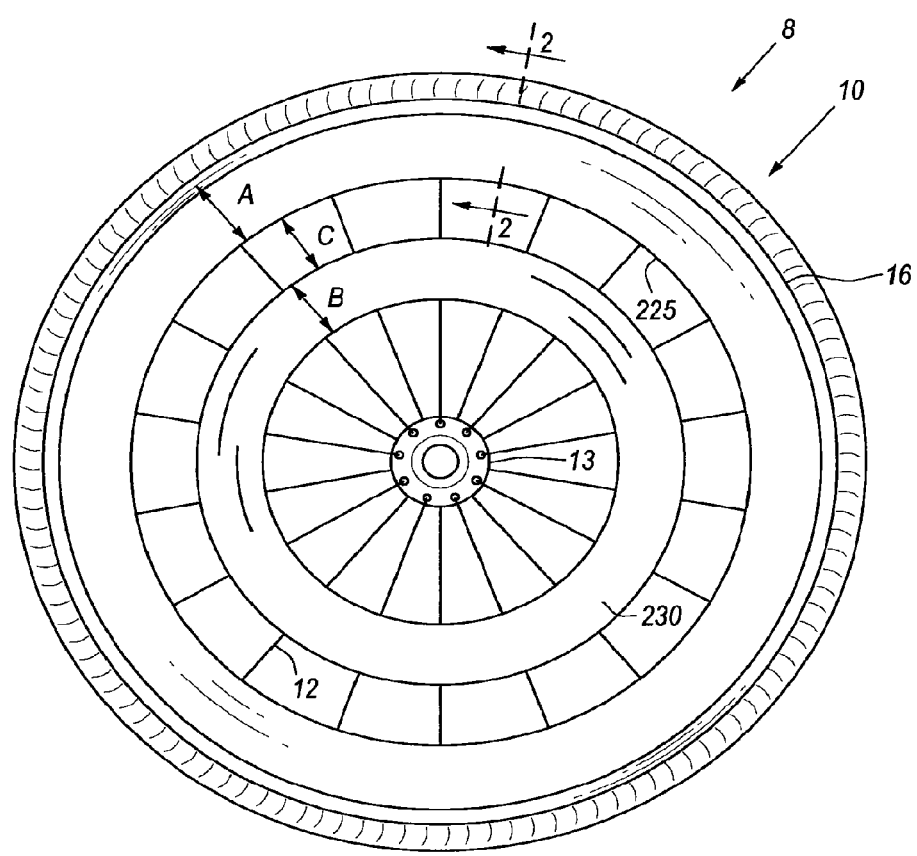
FIG. 22 is a side view of double rim wheel in accordance with exemplary embodiments of the present invention.

In order to overcome these and other deficiencies of current conventional deep-rimmed wheels, exemplary embodiments provide for a multi-surface rim, which has several advantageous features. For example, FIG. 22 is a side view of double or dual multi-surface rim wheel in accordance with exemplary embodiments of the present invention. Such rim advantageously provides for two low pressure regions, which allows for higher yaw angles without flow separation, better cross wind stability, and more usability. Moreover, because the overall rim surface can be reduced from a rim span of solid surface of equal length, the multi-surface rim embodiment may allow for the effectiveness of conventional deep-rimmed wheels, but also meeting UCI (and International Triathlon Union (ITU)) requirements.

Figure 23:
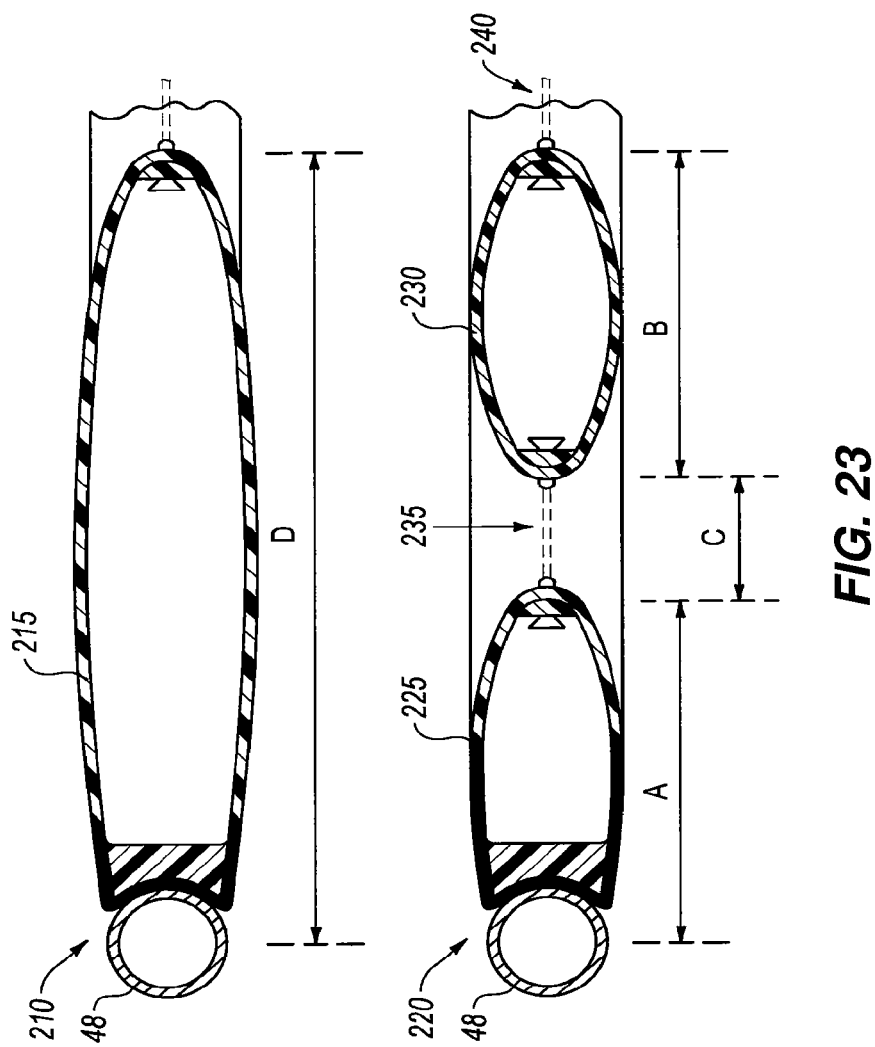
FIG. 23 is a somewhat schematic, sectional view taken along lines 2-2 of FIG. 22 for the double rim exemplary embodiment of the present invention that also compares the dimensional considerations of typical wide rims with those of the double rim exemplary embodiment.

For example, FIG. 23 is a somewhat schematic, sectional view taken along lines 2-2 of FIG. 22 and a comparison of the dimensional considerations of typical wide rims with the double rim exemplary embodiment of the present invention. As shown, a conventional wide rim 215 will have a total surface area along one side of the rim of distance "D". The double, dual, or split multi-surface rim embodiment of the present invention, however, reduces such surface area to the total area of "A" plus "B", representing the distance of the outer rim 225 and inner rim 230, respectively. In other words, the total surface area of the double or dual multi-surface rim is a length "C" less than the conventional length "D" of wide rims, representing the distance in between the outer 225 and inner 230 rims.

Note that although the above and following descriptions of example embodiments for the multi-surface rim generally refer to a double or dual surface, any number of corresponding surfaces that enhance the airfoil as described herein are also contemplated. For example, for curtain design parameters, a tri or quadruple surface are may provide an even wider overall surface area than the area of distance "D" described above; yet maintain good crosswind stability and UCI parameters along with the desired airflow attachment. In other words, other example embodiments consider any number of multi-surface rims 225, 230 configured in such a way as described below to enhance airfoil around the wheel. Accordingly, any specific use of any number of rim surfaces described herein is for illustrative purposes only and is not meant to limit or otherwise narrow the scope of the present invention unless otherwise specifically claimed.

Figure 24:
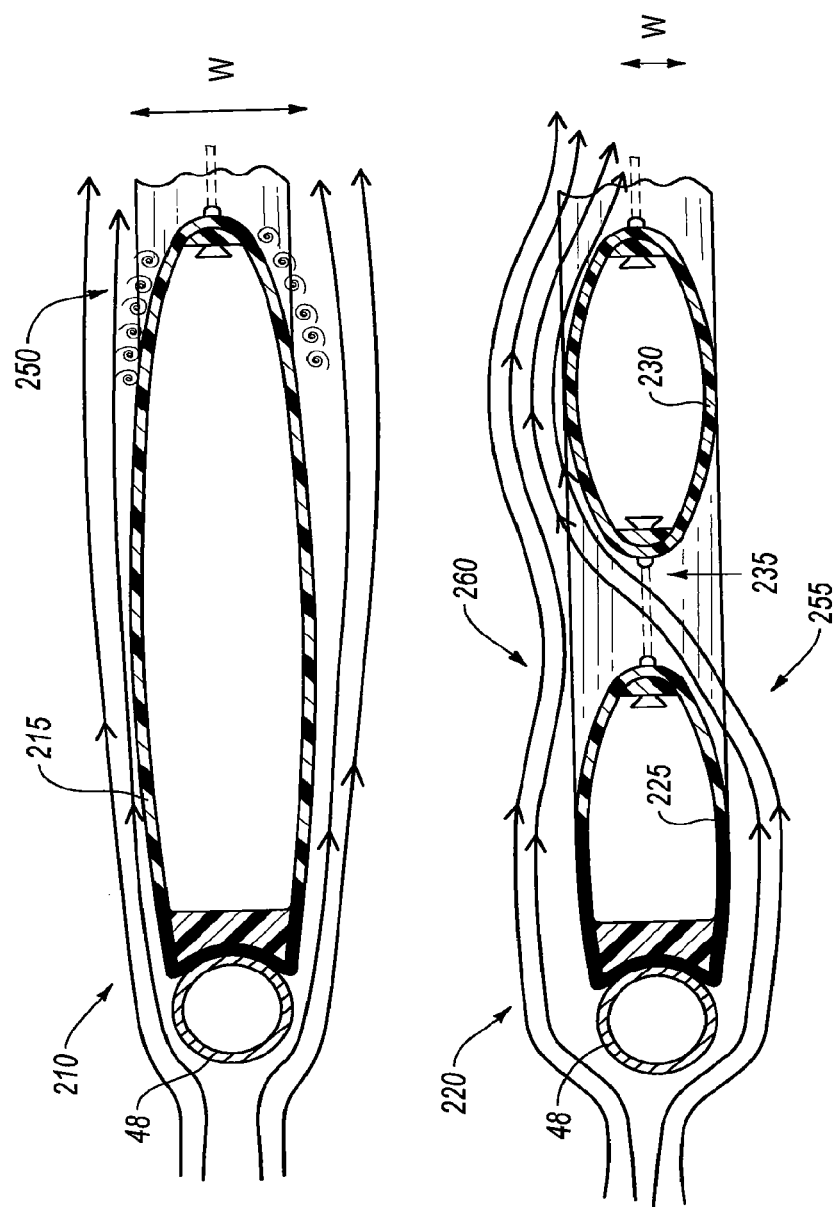
FIG. 24 illustrates the airflow advantage of the double rim exemplary embodiment of the present invention over typical wide rims.

As noted above, not only does the multi-surface rim of present embodiment advantageously meet UCI parameters, but it also enhances airflow attachment. For example, FIG. 24 illustrates the airflow advantage of the double or dual multi-surface rim 220 over typical wide rims 210. As shown, by allowing air flow from a true or windward side 255 to enter a leeward or low pressure side 260 of the rim 220, added energy flows to the area of low pressure 260 and reformation occurs of the separated flow on the leeward side 260 of the rim 220. As such, the wake "W" generated by conventional wide rims 210 due to the low and high pressure separation 250 on the different sides 215 of the rim 210 (causing early separation and turbulence 250) can be substantially reduced by the two low pressure regions 260 of the multi-surface rim 220 example embodiment. Thus, higher yaw angles are achieved with minimal flow separation, which also gives better crosswind stability. In other words, the slot 235 in between the outer 225 and inner 230 diameter rims creates a double peak of low pressure 260, enhanced flow attachment, and added energy, which provides a rider with increased drag reduction.

Figure 25A:
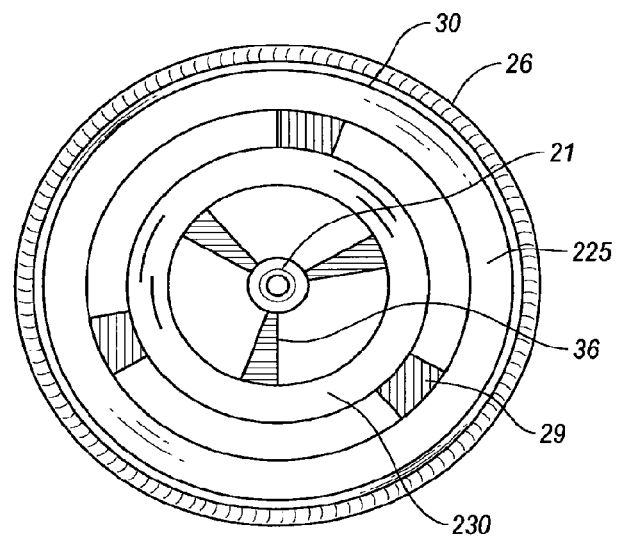
FIGS. 25A, 25B, and 25C illustrate cross sectional views of various double rim designs in accordance with exemplary embodiments of the present invention.
Figure 25B:
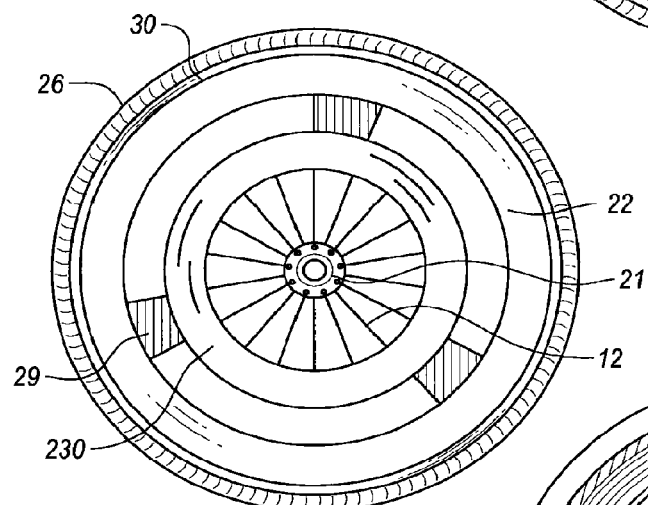
Figure 25C:
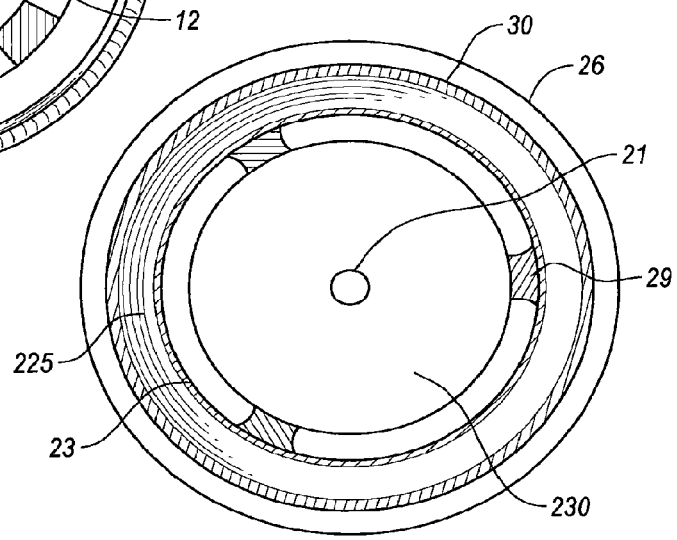

In accordance with other example embodiments, note that the inner 230 and outer 225 section of double or dual multi-surface rim 220 (or other multi-surface or split rims) may vary in size and attachment mechanisms. For example, FIGS. 25A, 25B, and 25C illustrate cross sectional views of various double or dual multi-surface rim designs in accordance with exemplary embodiments of the present invention. More specifically, these FIGS. 25A, 25B, and 25C show a tire 26 attached to an outer rim surface 225 and an inner rim surface 22 attached to a hub 21 using various combinations of spokes and/or blade attachment mechanisms. Note that the outer portion 225 of multi-surface rim 200 may include a braking surface 30 and attaches to the tire 26, whereas the inner portion 230 of the multi-surface rim joins the outer surface 225 to the hub 21 with various attachment mechanisms including: spokes, blades, solid wheel sections, or any combination thereof.

For example, as shown in FIG. 25A, multi-surface rim 200 uses three narrow joining struts 29 for joining the outer 225 and inner 230 rims. Further, a tri-spoke system 36 is then used to attach the inner 230 rim to the hub 21 using conventional mechanisms. Alternatively, the inner rim 230 (or outer rim 225) may be attached to the hub 21 by conventional wire spokes 12 as illustrated in FIG. 25B. In another embodiment, the inner rim 230 may be formed as a solid unit attached to the hub 21 as shown in FIG. 25C, with the other rim 225 attached using either narrow joining struts 29 or spokes 12 as desired.

Of course, any combination of multi-surface spoke, blade, and/or solid rim design is contemplated herein. Further, as previously mentioned, the double, dual or split rim design may be extended to include additional inner or outer rim sections as necessary. As such, the use of any particular type of mechanism for joining the rims or the use of only joining two or any particular number of rims is used herein for illustrative purposes only and is not meant to limit or otherwise narrow the scope of the present invention unless otherwise explicitly claimed.

In summary, the above use of the multi-surface rim in accordance with exemplary embodiment provides for the advantageous features of a wider rim, while reducing the overall cross sectional area for UCI calculations. Further, because of the flow separation or boundary slit, areas of higher pressure are able to flow to the low pressure side in giving added stability, energy, and achieving enhanced flow attachment over conventional style rims.

Rim Sealing Kit/Tubeless Tire Conversion Kit

As previously mentioned, another example embodiment advantageously provides for a rim sealing kit for tubeless tires, which provides for both a sealing and a tire mounting enhancement feature. In other words, exemplary embodiments of the present invention not only provide for a easy and convenient mechanism for sealing non UST rims, thereby making them tubeless, but it also allows for low pressure seals for both UST and non-UST rims.

Figure 26A:
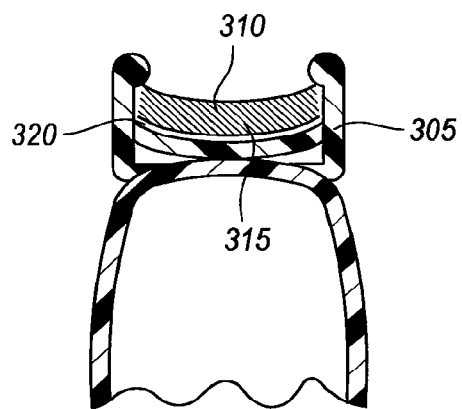
FIGS. 26A and 26B illustrate the use of tubeless conversion and enhancement kit for tire guiding and air sealing in accordance with exemplary embodiments of the present invention.
Figure 26B:
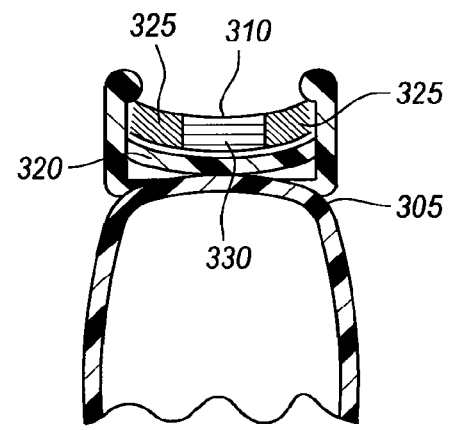

For example, FIGS. 26A and 26B illustrate the use of tubeless conversion and enhancement kit that utilizes both single and double density foam like materials for sealing and tire mounting guides on a rim in accordance with exemplary embodiments of the present invention. Similarly, FIGS. 27A and 27B illustrates the use of the tubeless tire kits shown in FIGS. 26A and 26B for mounting a tire in accordance with exemplary embodiments of the present invention. As shown in FIG. 26A, a stack 320, 315, 310 height of specific materials to convert a traditional rim to be "Tubeless Compatible" in accordance with example embodiments. One function of this kit allows the user to inflate a tire with a traditional manual inflation tool and doesn't require the use of a compressor.

In one embodiment, the stack is made of foam like material 315, which pushes the tire upwards and outwards from the inner portion of the rim. For example, as shown in FIG. 27A, a malleable material 345 (e.g., foam, sponge, silicone, or other similar material capable of compressed, but tending to return to its natural shape) sits on the inner part of the clincher time. As the tire 48 is pushed into the clincher, the foam like material 345 deforms sufficiently to allow the ease of mounting the tire on the rim. Once mounted, the foam material 345 pushes the tire beads 159, 165 upward and outward by making contact with the foam most every point of the rim channel. In other words, the malleable material 345 pushes the tire beads 159 165 to contact the clinchers 131 and 141, which allows minimal air pressure for sealing the tire 48 to the sidewalls 138 and 130 of the rim.

As shown in FIG. 26B, one embodiment makes use of multi-density foam like material wherein the outer materials 325 are of higher density than the center portion 330. The advantage of the multiple density foam construction is the center section 330 can allow the tire 48 to be installed and removed more easily, while the shoulders/edges 325 of the section can offers a tighter sealer with the tire 48 as well as an improved rebound to the tire compressive movements.

Note also that exemplary embodiments also accommodate different tire fits as well as rim shapes through the expansion and compression of the foam like material 345. The tire 48 to rim interface 138, 130 can be inconsistent in size and shape. Example embodiments utilizing the nature of a malleable material 345 allows the kit to change shape and size to accommodate the variations that occur both in interface as well as product inconsistency. This is very advantageous in keeping the kit in contact with the tire to avoid the loss of air or sealant (Burping) during use.

As previously noted, there are multiple constructions for this type of embodiment. For example, as shown in FIG. 26A, one or more membranes 310 and 320 may be formed above and/or below the foam like material 315 in the channel of the rim with constant foam center layer. The upper membrane may be made of a highly durable material with slippery properties that allow beaded edges of the tire 48 to more readily move into sealing position. For example, the membrane may be made of silicon, plastic, or coated rubber section, which is also capable of deformation like the foam like material 315. The bottom membrane 320 may be made of a similar type material, but with more inherently sealant, tacky and/or sticky properties. For instance, the lower membrane 320 or material may be made of rubber, silicon, tarlike, material with adhesive properties for holding the foam like material 315 in place and/or making the channel 305 of the rim airtight.

Note that although the three layers 310, 315, and 320 are illustrated as separate materials, one or all of the materials may be similar in molecular and/or chemical makeup. For example, silicon has all the properties of being malleable, sticky for sealing before setting, but slippery after formation. Of course, other type materials or combination of materials are also contemplated herein. As such, the use of the separate layers and/or the use of any particular type of material is used herein for illustrative purposes only and is not meant to limit or otherwise narrow the scope of described embodiments unless otherwise explicitly claimed.

In accordance with another example embodiment, and as illustrated in FIG. 26B, the one or more membranes 310, 320 may be formed with multiple densities of foam like material 315. The foam like material 315 may also be ran with or without one or both membranes given the particular application as previously mentioned.

As will be appreciated, the exemplary sealant kit embodiment herein described offers many benefits to the user. For example, in addition to items listed above it also is very simple to install and remove. For instance, if the foam material 315 may be a simple strip with an adhesive tape like lower surface that lightly holds the foam 315 in place at the base of the channel 305. Accordingly, foam 315 material may be easily installed and replaced as necessary.

In short, example embodiments provide for a bicycle sealing kit for creating a tubeless rim and tire seal that comprises: a foam like material capable of being formed on the inner portion of a channel for a clincher rim, wherein the foam like material substantially covers the inner portion of the rim channel such that when a tire is placed on the rim, the foam material pushes one or more bead seals of the tire toward clincher seals on the rim for ease in applying low pressure in forming a seal between the tire and the rim. Note that the foam like material can be made of at least two different densities. In addition, the foam like material may be covered on one or more sides with an additional membrane for adhesively attaching the foam like material to the rim or with a slipper type material for ease in promoting the beads of the tire toward the clinchers of the rim.

General Related Descriptions of FIGS. 1, 3-8

The following describes some general bicycle wheel and rim designs and construction that utilize example embodiments described herein. Generally and historically, bicycle wheels consisted of a plurality of spokes connected to a wheel hub at one spoke end and to a tire bearing rim at the other spoke end. This traditional design introduces unwanted turbulence around the bicycle wheel. This turbulence manifests itself as drag. Drag acts against the bicycle's motion through the air, thereby requiring a rider to expend additional energy to move through the air.

Description of Rims

The rim is commonly a metal extrusion that is butted into itself to form a hoop, though may also be a structure of carbon fiber composite, and was historically made of wood. Some wheels use both an aerodynamic carbon hoop bonded to an aluminum rim on which to mount conventional bicycle tires.

Metallic bicycle rims are now normally made of aluminum alloy, although until the 1980s most bicycle rims—with the exception of those used on racing bicycles—were made of steel and thermoplastic.

Rims designed for use with rim brakes provide a smooth parallel braking surface, while rims meant for use with disc brakes or hub brakes sometimes lack this surface.

The Westwood rim is designed for use with rod-actuated brakes, which press against the inside surface of the rim. These rims cannot be used with caliper rim brakes.

The cross-section of a rim can have a wide range of geometry, each optimized for particular performance goals. Aerodynamics, mass and inertia, stiffness, durability, tubeless tire compatibility, brake compatibility, and cost are all considerations.

Aluminum rims are often reinforced with either single eyelets or double eyelets to distribute the stress of the spoke. A single eyelet reinforces the spoke hole much like a hollow rivet. A double eyelet is a cup that is riveted into both walls of a double-walled rim.

Clincher Rims

Most bicycle rims are "clincher" rims for use with clincher tires. These tires have a wire or aramid (Kevlar) fiber bead that interlocks with flanges in the rim. A separate airtight inner tube enclosed by the rim supports the tire carcass and maintains the bead lock. If the inner part of the rim where the inner tube fits has spoke holes, they must be covered by a rim tape, usually rubber, cloth, or tough plastic, to protect the inner tube.

An advantage of this system is that the inner tube can be easily accessed in the case of a leak to be patched or replaced.

The ISO 5775-2 standard defines designations for bicycle rims. It distinguishes between: (1) Straight-side (SS) rims; (2) Crotchet-type (C) rims; and (3) Hooked-bead (HB) rims.

Traditional clincher rims were straight-sided. Various "hook" (also called "crotchet") designs emerged in the 1970s to hold the bead of the tire in place, allowing high (6-10 bar, 80-150 psi) air pressure.

Tubular Or Sew-Up Rims And Tires

Some rims are designed for tubular tires which are torus shaped and attached to the rim with adhesive. The rim provides a shallow circular outer cross section in which the tire lies instead of flanges on which tire beads seat.

Tubeless

A tubeless tire system requires an air tight rim—capable of being sealed at the valve stem, spoke holes (if they go all the way through the rim) and the tire bead seat—and a compatible tire. Universal System Tubeless (UST) is the most common system of tubeless tires/rims for bicycles, which was originally developed for mountain bikes but similar tubeless system exist for road bikes also. The main benefit of tubeless tires is the ability to use low air pressure for better traction without getting pinch flats because there is no tube to pinch between the rim and an obstacle.

Some cyclists have avoided the price premium for a tubeless system by sealing the spoke holes with a special rim strip and then sealing the valve stem and bead seat with a latex sealer. However, tires not designed for tubeless application do not have as robust a sidewall as those that are.

The drawbacks to tubeless tires are that they are notorious for being harder to mount on the rim than clincher tires. Plus, the cyclist must still carry a spare tube to insert in case of a flat tire due to a puncture since the ability to seal the tire edge to the rim requires significant air pressure, which a small hand pump typically cannot generate. More specifically, to seal the tubeless tire, you need to inflate it up to a high PSI very rapidly so that the beads lock into place. Most hand and even many other pumps simply cannot generate that kind of pressure. In addition, if one is not using a UST tire with thick side walls, the sidewalls tend to bow and or fall to the center of the rim requiring even greater air pressure to extend them out and seal against the edge of the rim.

Spokes

The rim is connected to the hub by several spokes under tension. Original bicycle wheels used wooden spokes that could be loaded only in compression, modern bicycle wheels almost exclusively use spokes than can only be loaded in tension. There are a few companies making wheels with spokes that are used in both compression and tension.

At the end of each spoke is a specialized nut, called a nipple, which is used to adjust the tension in the spoke. The nipple is usually located at the rim end of the spoke but on some wheels is at the hub end to move its weight closer to the axis of the wheel, reducing the moment of inertia. The use of aluminum nipples at the rim also reduces the moment of inertia, but they are less durable than brass. A third alternative is titanium nipples, which are extremely strong, but substantially lighter than brass. A nipple at the rim of a wheel usually protrudes from the rim towards the center of the wheel, but in racing wheels may be internal to the rim, offering a slight aerodynamic advantage.

Double-butted spokes have reduced thickness over the center section and are lighter, more elastic, and more aerodynamic than spokes of uniform thickness. Single-butted spokes are thicker near the rim and then all the way through the threads at the rim. Triple-butted spokes also exist.

Spokes are usually circular in cross-section, but high-performance wheels may use spokes of flat or oval cross-section, also known as bladed, to reduce aerodynamic drag. Some spokes are hollow tubes.

Forming

A wheel can be formed in one piece from a material such as thermoplastic (glass-filled nylon in this case) or carbon fiber. The former are commonly used for inexpensive BMX wheels and have a maximum tire pressure of 45 psi (3 bars or atmospheres). The latter may be used for high-end aerodynamic racing wheels.

Disc Wheels

Disc wheels are designed to minimize aerodynamic drag. A full disc is usually heavier than traditional spoked wheels, and can be difficult to handle when ridden with a cross wind. For this reason, international cycling organizations often ban discs wheels or limit their use to the rear wheel of a bicycle however international triathlon federations were (and are still) less restrictive and is what led to the wheels' initial usage growth in popularity in the 1980s.

A disc wheel may simply be a fairing that clips onto a traditional, spoked wheel, addressing the drag that the spokes generate by covering them; or the disc can be integral to the wheel with no spokes inside. In the latter case carbon fiber is the material of choice. A spoked wheel with a disc cover may not be legal under (UCI) Union Cyclist International rules because it is a non-structural fairing but are again acceptable under (ITU) International Triathlon Union rules.

A compromise that reduces weight and improves cross wind performance has a small number (three or four) tension-compression spokes molded integral to the rim—also typically carbon fiber.

Types—Bicycle Wheels can be Categorized by their Primary Use.

Road/Racing Bicycle Wheels

For road bicycle racing performance there are several factors which are generally considered the most important: (1) weight; (2) rotational inertia; (3) aerodynamics; (4) hub/bearing smoothness; and (5) stiffness.

Semi-aerodynamic and aerodynamic wheel sets are now commonplace for road bicycles. Aluminum rims are still the most common, but carbon fiber is also becoming popular. Carbon fiber is also finding use in hub shells to reduce weight; however, because of the hub's proximity to the center of rotation reducing the hub's weight has less inertial effect than reducing the rim's weight.

Semi-aerodynamic and aerodynamic wheel sets are characterized by greater rim depth, which is the radial distance between the outermost and the innermost surfaces of the rim; a triangular or pyramidal cross-section; and by fewer numbers of spokes, or no spokes at all—with blades molded of composite material supporting the rim. The spokes are also often flattened in the rotational direction to reduce wind drag. These are called bladed spokes. However, semi-aerodynamic and aerodynamic wheelsets tend to be heavier than more traditional spoked wheelsets due to the extra shapings of the rims and spokes. More important, the rims must be heavier when there are fewer spokes, as the unsupported span between spokes is greater. Improvements in the industry have made it possible to use roughly half the number of spokes previously used, primarily through improved aluminum alloys for the rims.

Most clincher carbon fiber wheel sets, still use aluminum parts at the clinching part of the rim. However, an increased number of all-carbon rims, such as those employed by EDGE Composites, are now available.

As mentioned above, a French tire manufacturer introduced a tubeless wheel system, Road Tubeless, which shares many similarities to the UST (Universal System Tubeless). Road Tubeless rims, like UST rims, have no spoke holes protruding to the air chamber of the rim. The flange of the Road Tubeless rim is similar to the hook bead of a standard clincher rim but must be contoured to very close tolerances to interlock with a Road Tubeless tire for creating an airtight seal between tire and rim. However, this system still suffers from similar drawbacks as those mentioned above with regard to UST rims.

Mountain Bike Wheels

26 Inch Wheel/ISO 55

26-inch clincher tires (with inner tubes) are the most common wheel size for off-road "mountain" bikes. This tradition was started initially because the early mountain bike pioneers procured the wheels for their early bikes from American-made bicycles rather than the larger European standards in use. The typical 26-inch rim has a diameter of 559 mm (22.0") and an outside tire diameter of about 26.2" (665 mm). Increasingly common are tubeless tires conforming to the UST (Universal System Tubeless) standard pioneered by French wheel manufacturer Mavic in conjunction with tire manufacturers Hutchinson and Michelin. In addition to elimination of rim strip and inner tube, the UST rim and tire combination allows the rider to run lower tire pressures for better traction and shock absorption without risking puncturing the tube in conventional bicycle tires. Kits such as those developed by Stan Koziatek (Stan's NotTubes) are available to convert non-UST bicycle wheels and tires to a tubeless configuration. This is accomplished by using a special tape to seal any nipple holes in a standard rim and injecting a liquid latex compound into the tire before inflation. The liquid latex fills the crevices and rubber voids of non-UST wheels and tires, creating an airtight seal. The sealing fluid can also be added inside UST wheelsets to provide enhanced sealing capability in the event of thorn or spike punctures.

29 Inch Wheels/ISO 622

"29-inch wheels", which also conform to the popular 700C (622 mm diameter clincher wheel standard) are becoming more popular for not only cyclocross bikes but also cross-country mountain bikes for larger riders. Their rim diameter of 622 mm (~24.5 inch) is identical to most road, hybrid and touring bicycle wheels but are typically reinforced for greater durability in off-road riding. The average 29-inch mountain bike tire has an outside diameter of about 28.5" (724 mm). There are advantages and disadvantages associated with this change discussed in detail in the main article.

700C Road Bicycle Wheels/ISO 622

Touring, race, and cyclo-cross bicycles may have vastly different design goals for their wheels. The lightest possible weight and optimum aerodynamic performance are beneficial for road bicycles, while for cyclo-cross strength gains importance, and for touring bicycles strength becomes even more important. However this diameter of rim, identical in diameter to the "29er" rim, is by far the most common on these styles of bicycles. It rolls more easily than smaller diameter tires. Road wheels may be designed for tubular or clincher tires, commonly referred to as "700C" tires.

BMX Wheels/ISO 406

Usually 20 inches in diameter (rim diameter of 406 mm), BMX (Bicycle Motocross) wheels are small for several reasons: they are suitable for young and small riders; their lower cost is compatible with inexpensive bicycles; the size makes them stronger to withstand the additional loads generated by BMX jumps and stunts; and to reduce rotational inertia for easier wheel acceleration.

Sizes

Bicycle rims and tires came in many different types and sizes before efforts were made to standardize and improve wheel/tire compatibility. The International Organization for Standardization (ISO) and the European Tyre and Rim Technical Organisation (ETRTO) define a modern, unambiguous system of sizing designations and measurement procedures for different types of tires and rims in international standard ISO 5775. For example:

For wired-edge tires the ISO designation lists the width of the inflated tire and the diameter with which the tire sits on the rim, both in millimeters and separated by a hyphen: 37-622

For beaded-edge tires the ISO designation lists an overall diameter code (16, 18, 20, 22, 24, or 26) and a width code (1.25, 1.375, 1.75, or 2.125), defined by measurement tables given in the standard, separated by a cross: $20_x 1.375$ For rims the ISO designation lists the rim diameter (where the tire sits) and the rim's inner width, both in millimeters and separated by a cross, along with a letter code for the rim type (e.g., "C"=Crotchet-type): 622×19C In practice, most tires (and inner tubes) sold today carry apart from the modern ISO 5775-1 designation also some historic size markings, for which there exists no longer any officially maintained definition, but which are still widely used: (i) an old French tire designation that was based on the approximate outer diameter of the inflated tire in millimeters: 700×35 C; (ii) an old British inch-based designation: 597 mm (26×1¼), 590 mm (26×1⅜, which is the most common), 630 mm (27×1¼), and 635 mm (28×1½). Which designation is most popular varies with region and type of bicycle.

Most road and racing bicycles today use 622 mm diameter (700C) rims, though 650C rims are popular with smaller riders and triathletes. The 650C size has the ISO diameter size of 571 mm. Size 650B is 584 mm and 650A is 590 mm. Most adult mountain bikes use "26 inch" wheels. Smaller youth mountain bikes use 24 inch and newer off-road bikes for large riders have adopted heavy 700C 29 inch wheels. The formerly popular 27 inch wheel size is now rare. These rims are slightly larger in diameter than 700C ("29er") wheels and are non-compatible with bicycle frames and tires designed for the 700C standard.

Wheel rims also come in a variety of widths to provide optimum performance for different uses. High performance road racing rims are narrow, 18 mm or so. Wider touring or durable off-road tires require rims of 24 mm wide or more.

Rolling Resistance

There are a number of variables that determine rolling resistance: tire tread, width, diameter, tire construction, tube type (if applicable), and pressure are all important. Smaller wheels, all else being equal, have higher rolling resistance than larger wheels. "Rolling resistance increases in near proportion as wheel diameter is decreased for a given constant inflation pressure."

Referring to the figures generally and in particular to FIGS. 1, 3 and 7-8, a bicycle wheel 20 is depicted that includes a toroidal rim 22 having a streamlined inner rim surface 23 to reduce wheel drag. Bicycle wheel 20 further includes a hub 42, and a spoke system 34. FIG. 7 illustrates that toroidal rim 22 includes a tire mounting surface 24 and a streamlined inner rim surface 23. Member 30 is formed in two sections as hereinafter described. A tire 26 is mounted on tire mounting surface 24. Tire 26 can also incorporate a tube (not shown).

Figure 4:
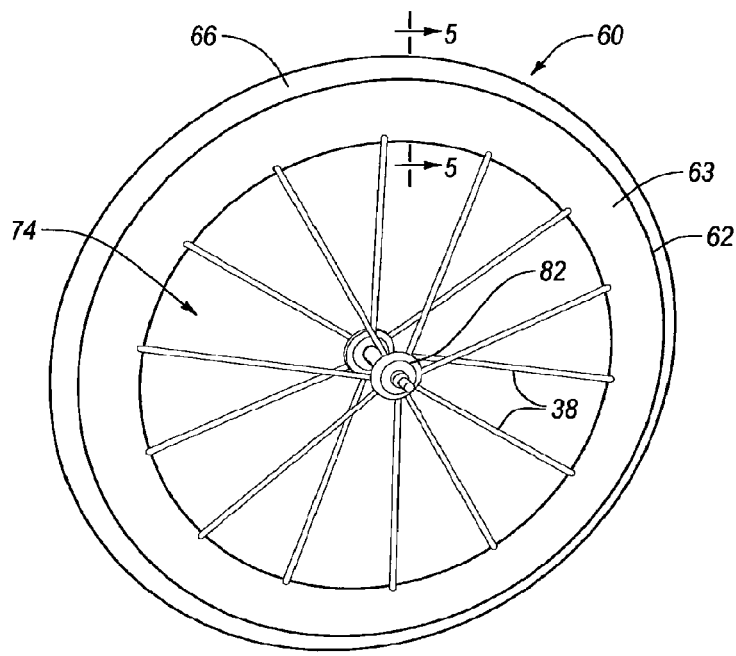
FIG. 4 is a perspective view of a wheel that may employ various embodiments of the present invention.

Referring to FIGS. 4-6, another bicycle wheel 60 in accordance with the embodiments is illustrated. Wheel 60 includes a rigid toroidal rim 62, a streamlined inner rim surface 63, a tire mounting surface 64 having a tire 66 mounted thereon, a rim reinforcing structure 70, a spoke system 74 and structure for securing spokes to rim 62 as hereinafter described and a hub 82. The components of wheels 20 and 60 can be similar except as described differently herein.

As used herein, toroid or toroidal means a surface generated by a plane closed curve rotated about a line that lies in the same plane as the curve but does not intersect it. Preferably, and as illustrated hi FIGS. 5 and 7, the plane closed curve which generates the form of toroidal rim 62 and 22, respectively is substantially an ellipse which has been modified to generate a concave end at the tire mounting surface 24. A tire mounted to surface 24 makes the overall shape more elliptical or lenticular, and is believed to provide the lowest achievable system drag, The major and minor cross-sectional dimensions of the toroidal rim define an aspect ratio. The aspect ratio of the rim, such as for rim 62, for example, is the ratio of the rim height (distance H in FIG. 5) to the rim width (distance W in FIG. 5). The rim height is defined as the maximum vertical rim dimension when the rim is oriented perpendicular to a horizontal plane. The rim width is the maximum horizontal dimension when the rim is oriented perpendicular to a horizontal plane. In the preferred embodiment, the toroidal rim and tire mounted thereto form a substantially elliptical cross section as depicted in FIG. 7, with the rim further having an aspect ratio ranging from about 2 to 5 and preferably at least about 2.25. Typically, and to obtain improved aerodynamic efficiency, the ratio of the maximum rim width W to the tire diameter D of FIG. 5 is in the range of from about 1 to 1.5 and preferably from about 1.05 to about 1.25.

While not wishing to be bound by theory, it is believed that good aerodynamic efficiency is achieved with the rim and wheels in accordance with embodiments because the countervailing aerodynamic factors of minimum frontal area and laminar or smooth airflow are balanced.

Figure 2:
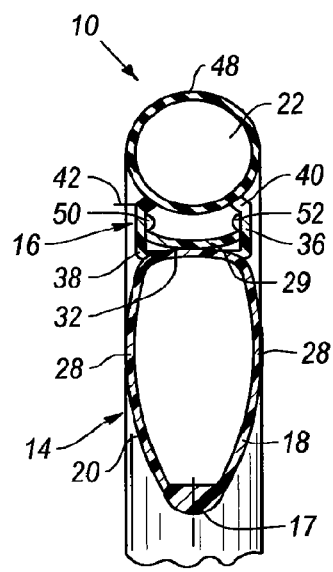
FIG. 2 is a somewhat schematic, sectional view taken along lines 2-2 of FIG. 9.

The toroidal rim of the invention can be constructed from a variety of materials, and can be a combination of them as for example composite and metal. For example, the tire mounting surface 24 and the upper portion of member 30 in FIG. 7 can be constructed of metal and the remainder of rim 22 including member 31, can be composite material. For example, any of the well-known composite materials, metals or alloys that have desired strength and toughness and that are otherwise suitable for bicycle wheels could be used. Furthermore, the interior of the rim can be solid, hollow, filled or reinforced as desired to obtain the desired strength, weight and cost. For example, FIGS. 7 and 8 show the use of an annular rim reinforcing member 30 within the rim which abuts the rim's outer perimeter. Surface 24 and member 30 may be an integral part of the remainder of rim 22 or may be a separate part. The entire volume of toroidal rim 22 may be filled with a filling media 28 as shown in FIG. 2. Both rim 22 and filling media 28 (a rigid foam material such as a urethane foam, for example) may be a high-strength, lightweight composite material which increases rim strength while only marginally increasing rim weight. For example, these components may be constructed of hand-laid fibers of high tensile strength and resistance to elongation such as Spectra (polyethylene) or an aromatic polyamide fiber such as Kevlar® or of carbon or ceramics. Alternatively, the wheel might be produced as an integral unit by any injection molding process known in the art. Methods of using such materials to form wheels are well known in the art.

Toroidal rims 22 and 62 each have a spoke system 34 and 74, respectively. While rims 22 and 62 could be used with a large number of spokes approximating the number traditionally employed in bicycle wheels, typically about 32 to 36 spokes, the preferred embodiments employ a drag reducing spoke system. Spoke system 34 is illustrated in FIG. 1. In this embodiment, a plurality of spokes 36 having a major cross-sectional dimension in the plane of the wheel and a minor cross-sectional dimension perpendicular to the wheel radiate from hub 42 toward streamlined inner rim surface 23. Streamlined inner rim surface 23 comprises a plurality of recesses 32 for butt joining spokes 36 to streamlined inner rim surface 23. Alternatively, the wheel of FIG. 1 might be produced as an integral unit by an injection molding or other process, FIG. 4 illustrates wheel 60 in accordance with embodiments that has a second type of drag-reducing spoke system 74 used in conjunction with wheel 60 and toroidal rim 62 which 4s similar to rim 22 except for spoke mounting provisions. In this embodiment, a plurality of conventional round metal bicycle spokes 38 radiate from hub 82 of conventional design. Other bicycle spokes could be used such as flat or streamlined spokes. Spokes 38 can comprise a threaded end portion 44 which can be used in conjunction with threaded spoke securing means 46 such as a nut 47 to secure spokes 38 to rim 62. In the embodiment shown in FIG. 5, an individual spoke passes through one of a plurality of first apertures 50 in inner rim surface 63. The spoke can then be secured inside toroidal rim 62 by a threaded nipple 48. Nipple 48 rests substantially within a complementary cavity 48' formed in support media 54 such that the nipple remains turnable within the cavity to allow the nipple to be threadably tightened on the threaded spoke end portion. A plurality of second apertures 52 in tire mounting surface 64, each radially spaced in line from a corresponding first aperture 50, allows access to the distal end of threaded nipple 48. A suitable tool (not shown) can be inserted through each of these second apertures 52 to turn the distal end of associated threaded nipple 48 so as to threadably move the nipple along the threaded spoke end portion to tighten the spoke to, or loosen the spoke from toroidal rim 62.

While wheel 60 is illustrated with fourteen conventional bicycle wheel spokes, it is to be understood that a fewer or greater number of spokes could be used. For example, a wheel with any number from 8-24 or more conventional bicycle wheel spokes could be utilized, depending on the load bearing requirements of the wheel. For most bicycle racers, about eight would be the minimum number of spokes that could be used.

General Description of FIGS. 2, and 9-14 as they Relate to Example Embodiments Described Herein As noted above and shown in FIG. 2, the wheel 8 may include a carbon body portion 14, and an aluminum tire engaging rim portion 16. As used in this application, the term "carbon" refers to a carbon fiber containing composite material, which is the preferred material to use in the present embodiments, examples of which are discussed above.

Turning again to FIG. 2, the carbon body portion 14, includes a radially innermost point 17, a first sidewall 18, a second sidewall 20, and an axially extending, radially outwardly facing, circumferential rim engaging portion 22. Each of the first and second side walls 18, 20 are bowed outwardly, so that the width of the carbon body 14 bows outwardly until it reaches its maximum point 28, which is disposed approximately one-third to one-half of the distance from the radially outermost point 22 to the radially inner most point 17. As one moves along the sidewalls 18, 20 from the maximum width point 28, toward the radially outer portion 22, it will be noted that the width of the carbon body portion 14 of the rim 10 decreases.

An endless extruded aluminum rim portion 16 includes a radially inner surface 29 that engages the radially outwardly facing surface 32 of the radially outer portion 22 of the carbon body portion 14. The aluminum rim 16 also includes a pair of braking surfaces 36, 38. Braking surfaces 36, 38 are not curved in cross section. Rather, the braking surfaces 36, 38 comprise planar rings (linear in cross section) to provide an enhanced surface for engagement by the caliper-type brakes (not shown) of the bicycle.

The extruded aluminum rim member 16 includes a pair of generally continuous circumferential bead members 40, 42 that are provided for engaging the inner bead of the tire 48 which is shown schematically in FIG. 2. It will be appreciated, that an actual tire has more of a "horse shoe" shape, (see e.g. FIG. 14) wherein the ends of the tires terminate in outwardly extending lips for engaging the radially inwardly facing surfaces 50, 52 of the tire engaging portion of the aluminum rim 16. The lips 159, 165 (FIG. 14) of the tire generally engage the radially inwardly facing surfaces 50, 52 just below the tire engaging beads 40, 42 of the aluminum rim member 16.

The aluminum hoop rim 1 is attached to the carbon body 14. The carbon body 14 has a bulbous shape, having its narrowest point 17 at the radially inner extreme of the carbon body 14. The widest part 28 of the carbon body 14, is approximately one-third to one-half the distance from the aluminum rim 16 to the radially inner most point 17. Typically, the width of the widest part 28 is about 22 to 35 mm in rims used with racing or touring wheels. However, with wheels used in mountain bikes, the widest part of the wheel could be up to 70 mm.

The endless aluminum hoop rim 16 circumferentially surrounds the carbon body through 360°. The aluminum rim portion 16 can be made in either of two different ways. One way to make the aluminum rim 16 is to make it as a "clincher" type rim, such as shown in FIG. 2. Clincher type rims are designed to engage clincher type tires, which are the type of tires used most widely with bicycles. Alternately, the aluminum rim 16 can be made to take "sew-up" or "tubular" type tires. Rims that are designed for sew-up wheels typically do not have beads, and have a tire mounting surface similar to that shown in FIG. 12.

The clincher rim is adapted to receive a tube and tire arrangement, and to clinch the bead of the tire onto the rim 10. In non-clincher wheels, the tire and tube are actually glued onto the rim.

It has been found by the applicant that the use of the carbon body portion 14 with an aluminum rim portion 16 provides some manufacturing advantages. For example, when manufacturing clincher type wheels, it is difficult to mold a carbon fiber material to create a bead section 40, 42 that is strong enough to withstand the pressure exerted thereon. As such, using the aluminum section 16 helps to make the manufacture of the wheel 8 easier.

The aluminum rim 16 includes two parallel planar braking surfaces 36, 38. The parallel, planar-ring shaped braking surfaces 36, 38 are provided for being engaged by the caliper type brakes of the bicycle. By having the braking surfaces 36, 38 both planar and parallel, the orientation of the calipers upon the braking surfaces 36, 38 is optimized. Additionally, for proper engagement, the brakes require a certain amount of radially extending length measured in a direction shown generally by line L of FIG. 10 for optimization of brake engagement.

The carbon body 14 is generally hollow, with curved sidewall 18, 20. The carbon body portion 14 preferably should be hollow (and not filled) for the wheel to operate correctly.

The carbon body portion 14 sidewall 18, 20 are curved from the rim engaging radially inner surface 32 to the radially inner-most point 17. The sidewall 18, 20 are actually wider than the braking surfaces 36, 38 of the aluminum rim 16. The radially outer-most, aluminum rim engaging surface 32 of the body portion 14 is curvilinear and somewhat "convex" to provide a good surface to which the aluminum rim 16 can bond. As shown in FIG. 2, the convex nature of the rim engaging surface provides a circumferential "crown" that extends around the circumference of the carbon body portion 14.

The aluminum rim 16 is bonded to the carbon body 14, through a combination of glue and mechanical pressure. By making the rim engaging portion 32 of the carbon body 14 somewhat crowned, the aluminum rim 16 can grab onto the rim-engaging surface 32, and is less prone to move laterally off of its engagement with the carbon body 14, even if the glue that is placed between the rim 16 and the carbon body 14 fails. Although the shape of the bonding surface 32 between the aluminum rim portion 16 and the carbon body 14 can take one of an infinite number of forms and still function, it is best to create an interface shape between the carbon body 14 and rim portion 16, that will promote the continued adhesion of the carbon body 14 to the rim portion 16, even if the glue or other adhesive that is placed between the two were to fail. As such, one would not want the rim engaging surface 32 to be perfectly planar, as a perfectly planar surface would be less likely to resist lateral movement of the rim 16 on the rim engaging surface 32 than a "crowned" surface.

As alluded to earlier, aluminum rim portion 16 also mechanically bonds to the carbon body 14. Because of the shape of the surfaces 29, 32 of the rim 16 and carbon body 14, respectively, when the aluminum rim portion 16 is joined to the carbon body 14, it is unlikely to come off because of the mechanical engagement there between.

Figure 10:
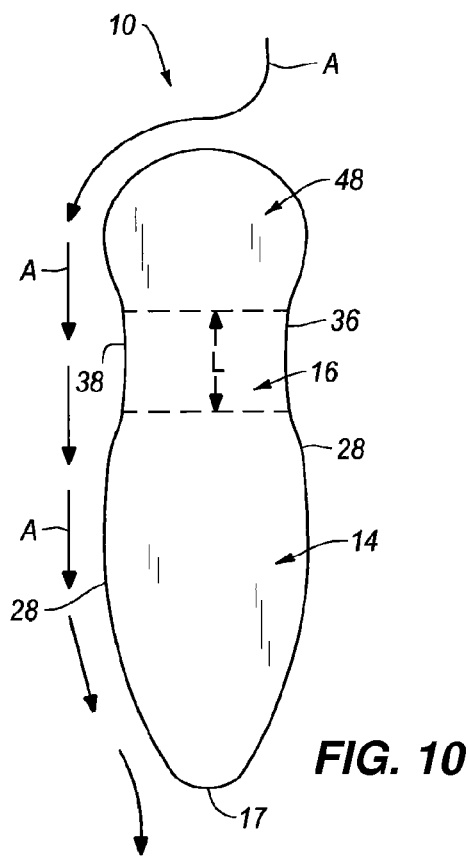
FIG. 10 is a profile view of a wheel and tire combination capable of implementing various aspects of the present invention.
Figure 9:
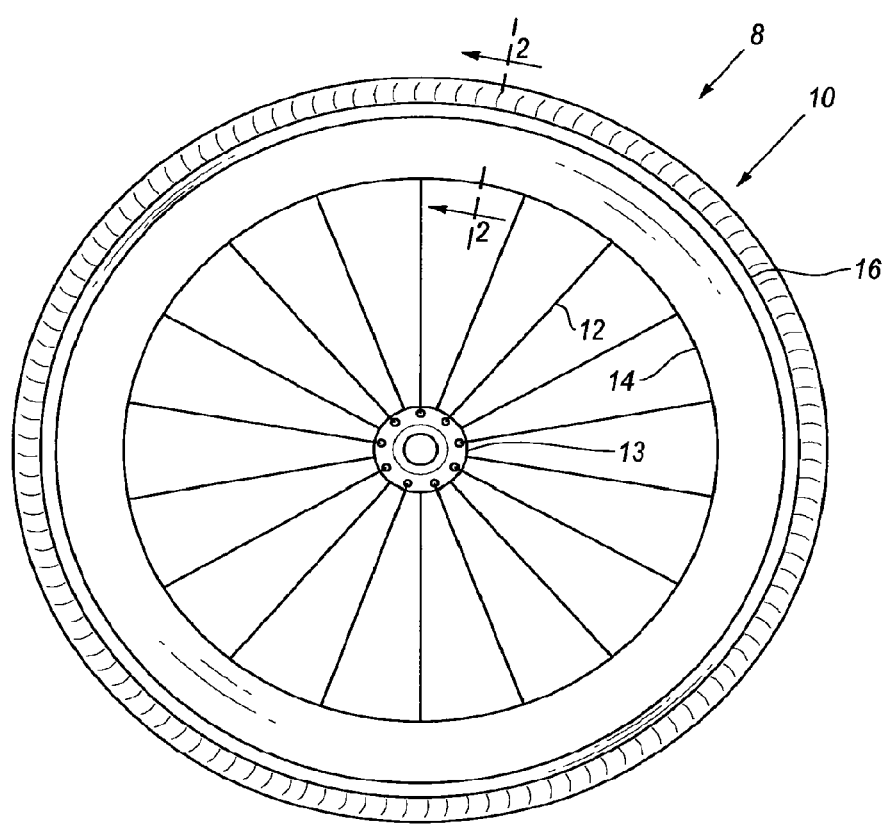
FIG. 9 is a side view of a wheel capable of employing various embodiments the present invention.

One of the advantages achieved with current embodiments is the manner in which in racing sized wheels (as opposed to mountain bike sized wheels), a regenerative airflow is created as the wheel and rim 16 are moving through the air. As best shown in FIG. 10, when the tire 48 engages the aluminum rim 16 and carbon body 14, the cross-sectional profile of the wheel 8 is somewhat "peanut" shaped. From an aerodynamic standpoint, as air moves around the side surface of the wheel 8, it moves in a direction shown generally by arrow A. The tire 48 "cuts" the air, forcing it around the side walls of the tire 48. The air moves outwardly as it passes the tire 48. However, as the tire 48 is generally wider than the braking surface 16, the air "detaches" as it approaches the area of the braking surfaces 36, 38. This induces some small amount of turbulence. As the air continues toward radially inward most point 17, it reattaches at the wide portion of the carbon body 14. To some extent, the degree of detachment of the air from the wheel 8 that occurs at braking surface 36, 38 will largely be a function of width of the tire 48. Notwithstanding the fact that the air "detaches", the bulbous sidewalls 18, 20 of the carbon body 14 enable the air to reattach so that it flows smoothly off the radially inward point 17 of the rim.

One of the features of disclosed embodiments is that the bulbous carbon body 14 helps to provide for smooth air flow along the trailing edge 17 of the airfoil shaped rim/wheel 8. As discussed above, braking ability is optimized if one uses parallel braking surfaces 36, 38. The use of the parallel braking surfaces 36, 38 causes some turbulent flow of the air that passes in the area adjacent to the braking surfaces 36, 38. However, the use of the bulbous carbon body portion 14 causes the air to reattach, and provides good aerodynamic flow of air off the trailing edge 17 of the wheel 8. As such, good aerodynamic properties are achieved, even though some detachment of air occurs.

Another feature that the bulbous shape of the body portion 14 provides is that one can use tires having various widths, while still providing good air flow characteristics. As the air is reattached along the carbon body portion 14 after passing the braking surfaces 36, 38, tires of various widths can still be used, while still permitting the carbon body 14 to reattach the air to provide good aerodynamic flow off the trailing edge 17. This regenerative type air flow is not believed to be known in the prior art.

With respect to structural manufacturing advantages of various embodiments, it should first be noted that the carbon body 14 is generally hollow. This permits the carbon body 14 to have the ability to flex, and the bulbous sidewalls 18, 20 contribute to this flex. The flex helps to extend the tire life, especially when the tire and rim 10 are used over rough terrain surfaces, such as would be typical when the rim 10 is attached to a mountain bike, or a street bike. In this regard, one of the previously alleged drawbacks of the use of a carbon rim, is that because of the inherent stiffness of carbon, the longevity of the carbon fiber rim could be reduced substantially if it were ridden over potholes and bumps. It was believed that the stiffness of the carbon would cause the carbon to break if it were treated too roughly. However, because of the bulbous nature of its sidewalls 18, 20 the rim 10 of some embodiments is capable of flexing when the rim 10 hits a pothole, thereby absorbing the shock somewhat.

Another feature of the bulbous carbon body relates its ability to be manufactured. To manufacture the carbon body 14 of embodiments, the carbon rim 14 is first manufactured in a mold, and the mold grabs the wheel along its side along the mold split line. In disclosed embodiments, it is found that the preferable place for the mold split line is at the radially inner most point 17, and the middle of the rim engaging surface 32.

After the carbon body rim 14 is made, the aluminum hoop-like rim portion 16 is placed around the rim engaging surface 32 of the carbon body 14. In order to do this, the endless aluminum rim 16 is heated and thereby expanded, and then placed around the rim engaging surface 32. In order to do this, the hoop-like rim 16 is cut so that it is no longer an endless hoop, but rather a discontinuous hoop having two, unjoined ends.

The hoop is cut, heated, and placed around the carbon section 14. The ends of the discontinuous aluminum hoop rim 1 are then joined by welding or by pinning, and the aluminum rim 16 is allowed to cool. As the aluminum rim portion 16 cools, the inner diameter of the aluminum rim portion 16 shrinks. This shrinkage helps to mechanically bind the aluminum rim 16 to the carbon body 14. During the shrinkage process, the bulbous nature of the carbon body's sidewall 18, 20 permits them to "bow laterally outwardly further" to accept the shrinkage caused by the cooling of the aluminum rim 16. However, before the aluminum rim 16 has joined the carbon body 14, a glue is placed on either or both of the rim engaging surface 29 of the aluminum rim, and the rim engaging surface 32 of the carbon body 14 to provide a chemical/glue bond between the carbon body 14 and the aluminum rim 16.

Another way in which the wheel can be manufactured is co-bonding. In such a case, a full aluminum hoop rim 16 is placed in the mold along with the carbon. The aluminum is placed in the mold at an elevated temperature, and is heated in the mold, along with the hot carbon. As the aluminum rim 16 cools, it shrinks against the carbon body portion 14, causing the sidewall 18, 20 of the carbon body portion 14 to flex (bow) outwardly.

A third way of manufacturing the device is to slip an endless hoop-like aluminum rim 16 onto an already molded carbon body. However, the problem with this approach is that it is difficult to place the endless hoop over the rim engaging surface 32 of the carbon body 14, unless the rim engaging surface 32 of the carbon body 14 is generally planar. As discussed above, this would have a disadvantage of increasing the potential of the rim 16 to become disengaged from the carbon body 14, if the glue bond between the rim 16 and carbon body 14 were to fail.

As discussed above, the preferred method is to cut the aluminum endless loop, heat it up, stretch it around the rim engaging surface 32, join the "ends" of the aluminum rim 16 together, so as to form an endless rim, and then allow the aluminum rim 16 to cool. As the aluminum rim 16 cools, the aluminum shrinks, which tends to exert a radially inwardly directed force against the carbon body 14. This radially inwardly directed force tends to cause the sidewall 18, 20 of the carbon body 14 to flex outwardly or to bow outwardly, inducing flex in the carbon body 14. If the sidewall 18, 20 of the carbon body 14 did not have some "beginning" bow to them (that is if they were planar and not bowed slightly outwardly to start with), then the shrinking of the aluminum rims 16 would tend to compress the sidewall in a radial direction without the bow, thus possibly causing structural problems on the carbon body 14.

Therefore, the placement of a certain amount of bow in the sidewall 18, 20, prior to joining the rim 16, helps to ensure that radial compression exerted by the cooling of the aluminum rim 16 as it shrinks will not break the aluminum hoop 16 or structurally impair the body portion. As the carbon sidewall 18, 20 have some flex in them, the radially outwardly directed force exerted on the aluminum rim 16 by the carbon body 14 is lessened, thus reducing the likelihood that the aluminum hoop 16 will split under the radially outwardly exerted pressure caused by the carbon body 14.

It has been found that the more planar the sidewall 18, 20, the more likely it is that the sidewall 18, 20 will not flex but instead will actually force the aluminum rims 16 outwardly, preventing it from shrinking, even though it is cooling. This would tend to cause a great deal of stress within the wheel, as the aluminum rim 16 would be forced to be stretched, while the carbon sidewalls 18, 20 of the wheel carbon rim body portion 14 would be simultaneously physically compressed, thus creating problems during cool down.

It has been found that the best temperature at which to heat the aluminum during its joinder process to the carbon body 14 is approximately 170° F. This temperature is chosen because it is the approximate brake temperature that a rim 10 of this type can achieve, during heavy braking at high speeds. As 170° F. is the temperature at which it is cured, brake-induced heating would cause the aluminum rim 16 to expand into its "natural state" as opposed to its relatively compressed, cooled down state. As 170° F. is the temperature at which the aluminum wheel rim 16 is bonded to the carbon body 14, this heating of the rim 16 during braking causes the aluminum rim 16 to expand, and the carbon sidewall 18, 20 to relax from their relatively compressed position. As such, there is generally neither stress in the aluminum caused by the aluminum compressing the carbon, nor is their stress in the carbon trying to force itself radially outwardly toward the aluminum rims 16 when braking.

Additionally, by choosing this 170° F. curing temperature, the stresses of the aluminum rim 16 and carbon body 14 are designed so that when the most heat stress is being placed on the wheel such as by braking, the wheel is actually experiencing the least amount of physically induced structural stress within the structure of the rim 10. This presents a good compromise design strategy. However, if one had bonded the aluminum rim 16 bonded to the carbon body 14 at ambient temperatures (e.g. 70° F.), the rim 10 under braking conditions would not only be under a tremendous amount of thermal stress caused by the heating of the aluminum rim 16, but additionally, the rim 10 would be under a great deal of bonding "stress", as great physical bonding strength would be required to keep the aluminum rim 16 and carbon body 14 together and joined, especially as the aluminum rim 16 would have expanded due to the heat.

By having the sidewall 18, 20 formed to be bulbous, the carbon sidewall 18, 20 are allowed to flex under stress so if you exert a radially inwardly directed force against the sidewall 18, 20, such as would occur when you hit a pothole hard or a bump, sidewall 18, 20 can flex because they are at an angle from that load.

When used on mountain bikes, the bulbous sidewall can help counteract the typical phenomena that result in tire and/or rim failure. One typical phenomena occurs where a tire compresses between what it hits (e.g. the pot hole), and the bead of the rim, to thereby create a flat tire. Because the carbon body 14 is flexible, as that compression happens, the sidewall 18, 20 can flex. This flex cannot generally occur with a fully aluminum rim. Because of this flex, the carbon sidewall 18, 20 of the carbon body 14 can at least partially absorb the shock, and thereby lessen the likelihood of a flat tire.

Additionally, because of the ability of the carbon sidewall 18, 20 to absorb the impact, an aluminum rim portion 16 is less likely to become bent when it hits a sharp object such as a pothole, when compared to a fully aluminum rim. It should be noted that the carbon wheel has "memory", so that when the load is relieved, the carbon sidewall 18, 20 will flex outwardly to their "pre-flexed" position, to bring the aluminum rim portion 16 back to its original point.

A third advantage provided by the bulbous sidewall 18, 20, is that they help to prevent the wheel from "pretzeling". When the wheel 8 is joined with a hub 13 and spokes 12, the rim 10 is under circumferential, radially inwardly directed compression. The rim 10 wants to relieve that stress and will create what is a wiggle or pretzel effect in the rim 10 to be able to reduce its size, and thereby reduce the tension in the spokes 12. Because of the bulbous sidewall 18, 20, the carbon body 14 and hence rim 10 have a lateral strength. The rim 10 and carbon body 14 have the ability to sustain themselves in a flat plane far beyond the ability of conventional wheels or other carbon rims that are on the market, that are used in connection with laced, tensioned spokes.

It should further be noted that the bulbous sidewall 18, 20 also help reduce "gator" pinch on the tire. Gator pinch occurs when the tire 48 hits a bump, and the rim 16 pinches the sidewall of the tire 48 against the radially outer edge 40, 42 of the rim 16. In extreme cases of gator pinch, the very thin tires typically used in connection with carbon rims can permit the bead 40, 42 to actually slash the tire 48 because of tremendous peak load induced on the tire 48 when it is flexed hard such as by hitting a sharp object such as a pothole.

To manufacture the wheel of some embodiments, the carbon hollow section 14 of the wheel is first molded. Then, an aluminum hoop 16 is cut, so that the endless hoop has two ends. Adhesive is then placed on the radially outwardly facing surface 32 of the carbon body 14, and the rim 16 is placed around the carbon body 14, and the ends of the rim 16 are joined together at the elevated heat. Prior to the rim 16 ends being joined, the aluminum rim 16 is heated to approximately 170° F. The adhesive is allowed to set up and cure at this 170° temperature. The rim 16 containing wheel is then removed from the heating unit, and the aluminum rim 16 is allowed to shrink onto the carbon body portion 14. From a manufacturing standpoint, this process enables the manufacturer to provide a wheel that is under a low amount of structural stress during times when high brake heats are applied to the wheel. The compression of the rim 16 as it shrinks onto the carbon body 14 also provides a good amount of mechanical bonding between the carbon body portion 14 and the rim 16.

The carbon body 14 can be formed through the use of a dry fiber, to which resin is added. Also, it can be done through a pre-preg type system, wherein the resin is already placed in the fiber before it is molded. Further, one can also perform resin transfer or a bladder molding because one of the reliant things of this structure is that it is hollow. As such, it cannot be filed with foam or honeycomb and so forth. Additionally, the carbon body 14 can be injection molded with a typical injection mold material such as a nylon, polyethylene, polypropylene, with a carbon fiber or a glass fiber. One can also utilize a glass fiber in place of a carbon fiber. However, that would change the performance characteristics of the wheel, although there would still be inherent sidewall flex, when mated with an aluminum rim 16 that shrinks during manufacture.

To join the rim 16 to the wheel 14, an epoxy adhesive is used. Various types of adhesives that may serve well in embodiments include acrylics, epoxies, methylmethacryate, cyan adhesives and the like. The preferred adhesive is an epoxy adhesive. With regard to the temperature at which bonding occurs, the preferable temperature is around 150-220° F. However, it is possible to still bond at as low as 120° F., or possibly as high as 300° F. To some extent, the bonding temperature is also dependent upon the nature of the adhesive, and the appropriate curing time for it.

With respect to the degree of bulbousness of the wheels, the degree of bulbousness (radius of curvature) could vary depending upon the amount of flex that one would wish to induce in the wheel. For example, mountain bikes are often ridden over very rough terrain. As such, a rim and wheel structure 8 for a mountain bike would typically have more bulbous sidewall 18, 20, with a higher degree of flex. Conversely, a track bike generally rides on a smooth surface. As such, flex is not important, and the degree of bulbousness can be reduced. Viewed another way, on mountain bike wheels it may be advisable to use a carbon body portion 14 wherein the sidewalls have a smaller radius of curvature then the wheels used on track bikes.

Figure 11:
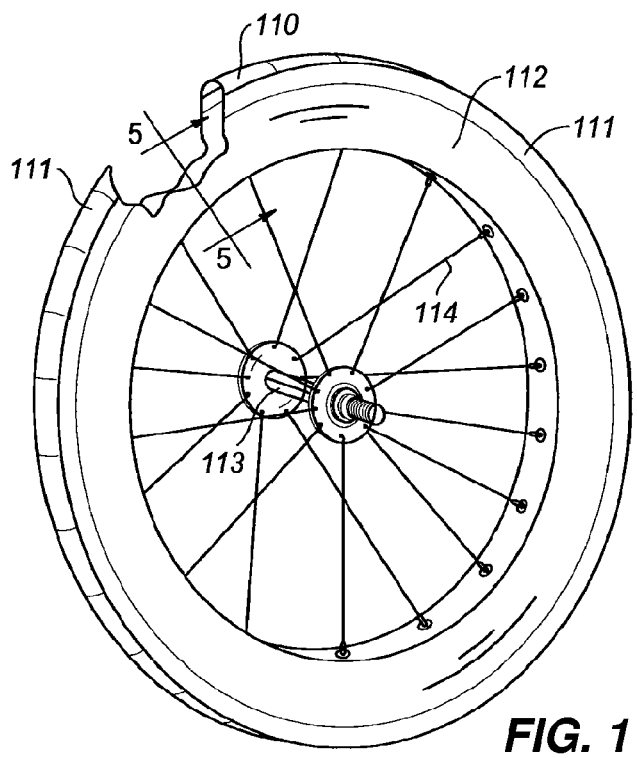
FIG. 11 is a perspective view of a bicycle wheel with tire, capable of implementing various aspects in accordance with the present invention.

Referring to FIG. 11, a bicycle wheel 100 is depicted showing a tire mounted thereto 110. The wheel 100 includes a pair of planar-ring, parallel and opposing brake surfaces, such as surface 111. Wheel 100 also includes a convex curved carbon body sidewalls 112, a center hub 113 and a plurality of spokes 114.

Figure 12:
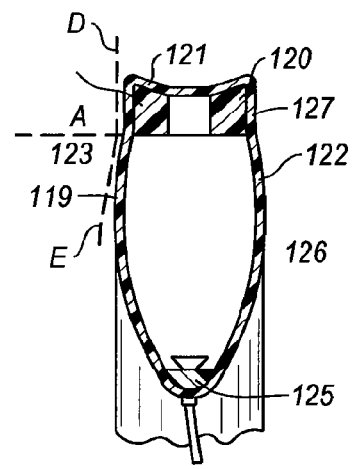
FIG. 12 is a transverse cross section as formed by lines 5-5 in FIG. 11, showing an alternate embodiment rim molded at one time using same materials.

In FIG. 12, a cross section of a wheel 100 is shown which is molded to be a one-piece wheel wherein the rim portion and body portion are made from a similar materials, in contrast to the two-piece wheels of FIGS. 9, 2, 10 and 13-14. The wheel of FIG. 12 has a tire mounting surface 121, a pair of straight and parallel braking surfaces 124 and 127; and a filled area of core material 120. An acute angle 123 is formed between the braking surface 124 and the first flexible sidewalls 119 and a line A generally parallel to the axis of the rim (see angle 123 and line A of FIG. 12). Viewed another way, a radially extending line D that is disposed in the plane of the first braking surface 124 would intersect a radially extending line E that is disposed tangentially to the first sidewall 119 of the body portion, at an axially outwardly facing intersection angle of less than 175°, and preferably less than 165°. The body portion extends from the first braking surface 124 to the second braking surface 127, and includes first 119 and second 122 sidewalls, and a hollow interior 126. The bulbous carbon body portion 134 includes a reinforced inner diameter portion, having spoke attachment points which are typically apertures, and which may include a metallic insert 125 for serving as an anchor for the spoke.

Figure 13:
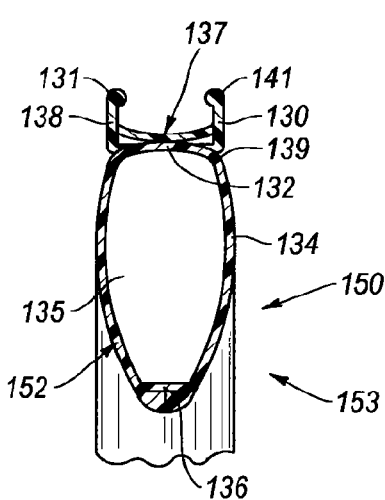
FIG. 13 is a transverse cross section as formed by lines 5-5 in FIG. 11, showing an alternate embodiment rim with an aluminum first area and a composite second area.
Figure 14:
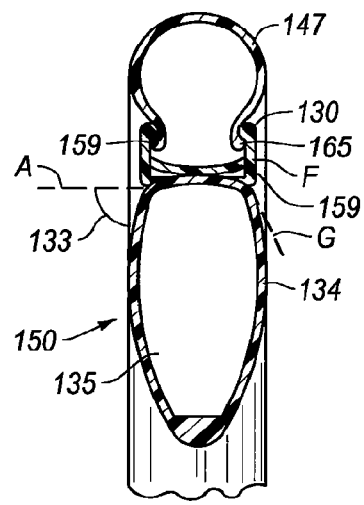
FIG. 14 is the same as FIG. 13 except that a tire is mounted to said rim.

FIGS. 13 and 14 show a transverse cross section similar to FIG. 2 for a two-piece wheel. This rim 150 is made of two dissimilar materials, including an aluminum tire engaging rim 137 having two parallel opposed braking surfaces 130, 138. The rim 137 also includes a pair of circumferential bead engaging members 131, 141, that are provided for engaging the beads 159, 165 of the tire 147.

The carbon body portion 153 includes a first sidewall portion 134 extending from the radially outer-most part 139 where the first sidewall intersects with the first braking surface 130, past the point of maximum width, and terminates at the radially inner-most point 136, which is shown as being thicker than the sidewall 134, and thereby being reinforced. The carbon body portion 153 includes a second sidewall portion 152 which extends between the intersection with the second braking surface 138 of the rim portion 137, and the radially inner-most point 136. The axially extending, radially outwardly facing rim engaging surface 132, includes a circumferential crown portion. The interior 135 is hollow to facilitate flex of the sidewalls.

A radially extending line F that is disposed in the plane of the first braking surface 130 intersects a radially extending line G that is disposed tangentially to the first sidewall 134 of the body portion 153 at an axially outwardly facing intersection angle 159. Intersection angle 159 should be less than 175°, but preferably is about 165° for road bikes and about 150° for mountain bikes. An acute angle 133 is formed between a line A perpendicular to the braking surface 138 and the first flexible sidewall 152 (see angle 13 and line A of FIG. 14).

FIG. 14 shows the same rim 150 as FIG. 13 but shows the rim 150 having a tire 147 mounted thereto, showing the combined shape of tire and rim to be that of an unshelled peanut, or two bulb areas joined by a straight section.

Cusp and Trip Edge

As previously mentioned, example embodiments reduce the drag coefficient observed across conventional tubular (and other style) rims caused from the separation between bicycle components or discontinuity within the surface of the rim. These areas of separation or discontinuities create turbulence or eddy current type disturbances in the air flow around the rim, thus increasing the drag coefficient or resistance.

For example, FIG. 15A illustrates a conventional wheel at a zero degree angle relative to the movement of air relative to the longitudinal cross section of the rim (shown by the lines and arrows 89 around the cross section). As shown, a small separation pocket along with a parallel braking surface 99 that creates a discontinuity in the rim surface inherits some air separation or turbulence 88 both between on the braking surface 87 and between the tire 48 and the rim 99. With a smaller tire 48 as shown, the flow attachment still performs relatively well at a zero degree crosswind (i.e., zero degrees relative to the elongated section or direction of the toroidal shape of the rim with the rim in motion).

With a tire 48 size increase, however, as shown in FIG. 15B, the larger tire 48 diameter causes a greater flow separation 88 and generally a greater drag increase even at a zero degree crosswind. Note that the larger tire 48 is popular due to the better reliability, lower rolling resistance; however, the larger separation or turbulence 88 shown both across the braking section 87 and between the tire 48 and the rim 99 will cause a much greater drag similar to a crosswind and causing even more problems in the presence thereof.

FIGS. 15C and 15D shows a cross section of conventional or standard tubular rims in a crosswind. Note that even at a 10 degree crosswind relative to the elongated or toroidal shape of the rim 99, the geometry of the rim is not favorable in a cross wind. In fact, as shown, the region of the rim 99 that lies behind the crosswind section presents the flow with an unfavorable pressure gradient, which makes it not only virtually impossible to achieve flow attachment but, also generates a side flow or increased cross wind. Also note that on the back of the wheel (shown in FIG. 15D), the relatively narrow rim shape of the leading (or trailing) edge of the toroidal shape can also cause a leading edge separation 88, which further adds to the overall instability and crosswind drag.

Ideally, the rim might be shaped like that shown in other figures with the attachment edges of the rim extending up the sidewalls of the tire and the braking surface in complete uniformity and flow with the edge and sidewalls of the wheel. In other words, to achieve an ideal wheel, one needs to extend the rim around the tire, but we also need to reduce the tire diameter—which may prove impractical due to the popularity of the larger size tire. In any event, such solution of extending the rim has numerous mechanical issues involving poor performance, feel, and harsh ride since it inadvertently, or directly, affects the tires roll. Also note that back of the toroidal shape of the rim can be increased to help with the attachment when flow goes in the opposite direction or on the back side of the wheel.

Embodiments overcome some of the deficiencies noted above by embedding trip edges or cusps in various parts of the rim. Note that although the described embodiments of using trip edges or cusps in reducing the turbulence and flow separation have been described in terms of tubular tires with toroidal shape rims, other types and styles of tires and rims are also contemplated herein. In fact, embodiments works well with any type of rim in which there is a discontinuity or separation that causes turbulence or separation of air flow attachment. As such, the above use of tubular tires and toroidal shape rims, or any other type of tire and rim combination, is used herein for exemplary purposes only as is not meant to limit or otherwise narrow the scope of present inventions described herein unless otherwise explicitly claimed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A human powered vehicle multi-surface rim comprising:
    an outer section of the multi-surface rim that includes a tire engaging portion located at an outward perimeter of the outer section of the rim, an inner portion located radially inward from the tire engaging portion, and two air engaging side surfaces extending radially between the tire engaging portion and the inner portion and forming axially opposing sides of the outer section of the multi-surface rim;
    one or more airfoil inner sections of the multi-surface, wherein each inner section includes an outward portion and an inward portion with two air engaging side surfaces extending radially between each outward portion and inward portion to form axially opposing sides of an airfoil shape for each inner section;
    wherein the one or more inner sections are located radially inward from the outer section and spaced separately from the outer section at a distance for allowing airflow to move between high and low pressure sides of at least the outer section and one of the one or more inner sections of the rim in promoting airflow attachment at the trailing edges of the outer and inner surface sections; and
    a plurality of spokes connecting the inner portion of the outer section to the outward portion of the one of the one or more inner sections of the rim.

2. The human powered vehicle multi-surface rim of claim 1, wherein the outer section is held in contact with at least one of the one or more inner sections by two or more narrow joining struts.

3. The human powered vehicle multi-surface rim of claim 2, wherein the at least one of the one or more inner airfoil sections is held in contact with a hub by two or more narrow joining struts.

4. The human powered vehicle multi-surface rim of claim 2, wherein the at least one of the one or more inner airfoil sections is held in contact with a hub by a single solid section.

5. The human powered vehicle multi-surface rim of claim 1, wherein a slot is defined between the inner portion of the outer section and the outward portion of the inner section to reduce drag.

6. The human powered vehicle multi-surface rim of claim 1, further comprising:
    a tire attached to the tire engaging portion of the outer section; and
    a hub joined to one of the inner sections.

7. The human powered vehicle multi-surface rim of claim 6, further comprising a tri-spoke system attaching the inner section to the hub.

8. The human powered vehicle multi-surface rim of claim 6, further comprising wire spokes connecting the inner section to the hub.

9. The human powered vehicle multi-surface rim of claim 6, wherein the inner section is a solid unit attached to the hub.

10. A multi-surface bicycle rim, comprising:
an outer rim including
a tire engagement portion configured to engage a tire,
an inner engaging portion located radially inwards from the tire engagement portion, and
a pair of outer rim sidewalls extending in a bowed manner from the tire engagement portion to the inner engaging portion;
an inner rim attached to the outer rim at a position location radially inwards to the outer rim, the inner rim including
an outer rim engagement portion spaced apart from the inner engaging portion of the outer rim, and
at least one inner rim sidewall extending in a bowed manner from the outer rim engagement portion;
wherein the outer rim and the inner rim define a slot between the inner engaging portion of the outer rim and the outer rim engagement portion of the inner rim to enhance flow attachment; and
a plurality of spokes extending in the slot from the inner engaging portion of the outer rim to the outer rim engagement portion of the inner rim.

11. The bicycle rim of claim 10, wherein a total distance along one side of the outer rim and the inner rim is more than a conventional 100 mm rim.

12. The bicycle rim of claim 10, further comprising:
a hub; and
a tri-spoke system attaching the inner rim to the hub.

13. The bicycle rim of claim 10, further comprising:
a hub; and
wire spokes connecting the inner rim to the hub.

14. The bicycle rim of claim 10, further comprising:
a hub; and
the inner rim being a solid unit attached to the hub.

15. A multi-surface bicycle rim, comprising:
an outer rim surface having
a tire engagement portion configured to engage a tire,
an inner engaging portion located radially inwards from the tire engagement portion, and
a pair of outer rim sidewalls extending in a bowed manner from the tire engagement portion to the inner engaging portion;
an inner rim surface located radially inwards from the outer rim surface, the inner rim surface having
an outer rim engagement portion spaced apart from the inner engaging portion of the outer rim surface to define a slot in between, and
at least one inner rim sidewall extending in a bowed manner from the outer rim engagement portion; and
a plurality of spokes extending in the slot from the inner engaging portion of the outer rim surface to the outer rim engagement portion of the inner rim surface, wherein the spokes secure the outer rim surface to the inner rim surface in a concentric manner.

16. The bicycle rim of claim 15, wherein a total distance along one side of the outer rim and the inner rim is more than a conventional 100 mm rim.

17. The bicycle rim of claim 15, further comprising:
a hub; and
inner spokes connecting the inner rim surface to the hub.

18. The bicycle rim of claim 15, wherein the outer rim surface and the inner rim surface each have a toroidal shape.

19. The bicycle rim of claim 15, wherein the slot extends in a concentric manner between the outer rim surface and the inner rim surface.

\* \* \* \* \*